US012594998B2

(12) United States Patent
Otsuka et al.

(10) Patent No.: US 12,594,998 B2
(45) Date of Patent: Apr. 7, 2026

(54) STIFFENED PANEL STRUCTURE

(71) Applicant: NIPPON STEEL CORPORATION, Tokyo (JP)

(72) Inventors: Kenichiro Otsuka, Tokyo (JP); Toru Yonebayashi, Tokyo (JP); Satoshi Shirakami, Tokyo (JP); Yasunori Sawa, Tokyo (JP); Masafumi Azuma, Tokyo (JP); Ryuichi Nishimura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 39 days.

(21) Appl. No.: 17/802,475

(22) PCT Filed: Feb. 26, 2021

(86) PCT No.: PCT/JP2021/007430
§ 371 (c)(1),
(2) Date: Aug. 25, 2022

(87) PCT Pub. No.: WO2021/172536
PCT Pub. Date: Sep. 2, 2021

(65) Prior Publication Data
US 2023/0100272 A1     Mar. 30, 2023

(30) Foreign Application Priority Data
Feb. 28, 2020     (JP) ................................ 2020-034294

(51) Int. Cl.
*B62D 25/02*     (2006.01)
*B60J 5/04*     (2006.01)
*B62D 29/00*     (2006.01)

(52) U.S. Cl.
CPC ............ *B62D 25/02* (2013.01); *B60J 5/0455* (2013.01); *B62D 29/007* (2013.01)

(58) Field of Classification Search
CPC ... B60J 5/0455; B60J 5/00; B60J 5/044; B60J 5/0422; B60J 5/042; B60J 5/0423;
(Continued)

(56) References Cited

U.S. PATENT DOCUMENTS 3,700,076 A * 10/1972 Forsting ................. B60J 5/0458
                                                            188/371
3,758,905 A * 9/1973 Baratta ................... E01D 11/00
                                                            14/19
(Continued)

FOREIGN PATENT DOCUMENTS

DE         4213817 A1 * 10/1993 ............ B60J 5/0458
JP         54-33515 U     3/1979
(Continued)

*Primary Examiner* — Amy R Weisberg
*Assistant Examiner* — Veronica M Condo
(74) *Attorney, Agent, or Firm* — Birch, Stewart, Kolasch & Birch, LLP

(57) ABSTRACT

A stiffened panel structure includes a panel-shaped component and a wire. The panel-shaped component has a panel body that curves in such a manner as to be convex outward. The wire has a first end portion and a second end portion. The first end portion is bonded to a first point on the inner surface of the panel body. The second end portion is bonded to a second point on the inner surface of the panel body. The wire is strained between the first point and the second point.

16 Claims, 25 Drawing Sheets

<u>1</u>

(58) Field of Classification Search
CPC ...... B60J 5/0425; B60J 5/0426; B60J 5/0427;
B60J 5/0429; B60J 5/043; B60J 5/0431;
B60J 5/0433; B60J 5/0434; B60J 5/0436;
B60J 5/0456
USPC ............................ 296/203.03, 146.6, 193.11
See application file for complete search history.

(56) References Cited

U.S. PATENT DOCUMENTS

| | | | | |
|---|---|---|---|---|
| 4,290,235 | A * | 9/1981 | Jahnle | B60J 5/0426 |
| | | | | 49/502 |
| 5,197,167 | A * | 3/1993 | Marler | B60R 13/0206 |
| | | | | 24/458 |
| 5,431,476 | A * | 7/1995 | Torigaki | B60J 5/0458 |
| | | | | 296/202 |
| 6,220,652 | B1 * | 4/2001 | Browne | B60J 5/044 |
| | | | | 49/502 |
| 7,052,075 | B2 * | 5/2006 | Kamada | B62D 25/105 |
| | | | | 296/193.11 |
| 7,331,626 | B2 * | 2/2008 | Yoshimoto | B62D 21/157 |
| | | | | 296/187.12 |
| 7,631,925 | B2 * | 12/2009 | Tanaka | B60J 5/0443 |
| | | | | 296/146.2 |
| 8,991,898 | B2 * | 3/2015 | Iwano | B60J 5/0429 |
| | | | | 296/146.6 |
| 10,059,178 | B2 * | 8/2018 | Miyake | B60J 5/107 |
| 10,913,403 | B2 * | 2/2021 | DeJong | B60J 5/0415 |
| 2005/0046233 | A1 * | 3/2005 | Saeki | B62D 21/157 |
| | | | | 296/187.12 |
| 2020/0114739 | A1 * | 4/2020 | Kuntze | B60J 5/044 |
| 2021/0206244 | A1 | 7/2021 | Nakagawa et al. | |
| 2021/0283999 | A1 * | 9/2021 | Harney | B60J 5/107 |

FOREIGN PATENT DOCUMENTS

| | | | | | | |
|---|---|---|---|---|---|---|
| JP | 5-246243 | A | | 9/1993 | | |
| JP | 2006-298113 | A | | 11/2006 | | |
| JP | 2008-68757 | A | | 3/2008 | | |
| JP | 2009-113566 | A | | 5/2009 | | |
| JP | 2009-126359 | A | | 6/2009 | | |
| JP | 2010179734 | A | * | 8/2010 | | |
| JP | 2011-189843 | A | | 9/2011 | | |
| JP | 2018-16171 | A | | 2/2018 | | |
| JP | 2019-156384 | A | | 9/2019 | | |
| WO | WO-2020108859 | A1 | * | 6/2020 | | B60J 5/00 |

\* cited by examiner

10 N load

25 N load

PRIOR ART

STIFFENED PANEL STRUCTURE

TECHNICAL FIELD

The present disclosure relates to a stiffened panel structure.

BACKGROUND ART

An automobile includes panel-shaped components such as outer panels and the like. Such panel-shaped components are required to have sufficiently high flare rigidity. Some stiffened panel structures for automobile doors, which have enhanced flare rigidity, have been known (see, for example, Japanese Patent Application Publication No. 2019-156384 (Patent Literature 1) and Japanese Patent Application Publication No. 2018-016171 (Patent Literature 2). In the present specification, a panel-shaped component used for an automobile door will be referred to as a door panel in some cases.

FIG. 28 is a sectional view of an example of a conventional stiffened structure 301. FIG. 29 is another example of a conventional stiffened structure 301. In each of FIG. 28 and FIG. 29, a yet-to-be-finished stiffened structure 301 is depicted in an upper section, and a finished stiffened structure 301 is depicted in a lower section.

The stiffened structure 301 shown in FIG. 28 includes a door panel 302 including a panel body 321. A reinforcing member 303 is stuck to the inner surface 321a of the panel body 321. The reinforcing member 303 is entirely bonded to the panel body 321. This ensures sufficient flare rigidity of the panel body 321.

The reinforcing member 303 is made of resin. Before baking finishing, the reinforcing member 303 is bonded onto the inner surface 321a of the panel body 321 (see upper section of FIG. 28). The reinforcing member 303 bonded to the panel body 321 is hardened by heat at the time of baking finishing and adheres tightly to the panel body 321.

Usually, the door panel 302 including the panel body 321 is made of steel. The reinforcing member 303, which is made of resin, and the door panel body 321, which is made of steel, greatly differ in coefficient of linear expansion. Accordingly, when heat is applied to the door panel 302 with the reinforcing member 303 bonded thereto during baking finishing, the reinforcing member 303 and the panel body 321 have different deformation amounts. Therefore, the panel body 321 undergoes elastic deformation and may further undergo plastic deformation in some cases. This causes the panel body 321 to have pits and projections 322 (see lower section of FIG. 28). Thus, regarding the stiffened structure shown in FIG. 28, the surface quality of the door panel 302 may be degraded.

Regarding the stiffened structure 301 shown in FIG. 29, however, the reinforcing member 303A bonded onto the inner surface 321a of the panel body 321 is made of steel. Therefore, the reinforcing member 303A and the panel body 321 are not different in coefficient of linear expansion. Then, it never happens that the heat at the time of baking finishing leads to degradation of the surface quality of the door panel 302.

In this case, however, it is necessary to strictly manage the dimensional accuracy of the reinforcing member 303A. If a reinforcing member with low dimensional accuracy is bonded to the panel body 321 as the reinforcing member 303A (see upper section of FIG. 29), the panel body 321 undergoes elastic deformation along the shape of the reinforcing member 303A and may further undergo plastic deformation in some cases (see lower section of FIG. 29). Thus, even the stiffened structure 301 shown in FIG. 29 can have a problem of low surface quality of the door panel 302.

CITATION LIST

Patent Literatures

[Patent Literature 1] Japanese Patent Application Publication No. 2019-156384
[Patent Literature 2] Japanese Patent Application Publication No. 2018-016171

SUMMARY OF INVENTION

Technical Problem

As described above, conventional stiffened structures have a problem of low surface quality of a panel-shaped component. When a panel-shaped component has low surface quality, the flare rigidity of the panel-shaped component may not be so enhanced as expected.

An object of the present disclosure is to provide a stiffened panel structure in which the panel-shaped component has sufficient surface quality and improved flare rigidity.

Solution to Problem

A stiffened panel structure according to the present disclosure includes a panel-shaped component and a wire. The panel-shaped component includes a panel body that curves in such a manner as to be convex outward. The wire has a first end portion and a second end portion. The first end portion is bonded to a first point on an inner surface of the panel body. The second end portion is bonded to a second point on the inner surface of the panel body. The wire is strained between the first point and the second point.

Another stiffened panel structure according to the present disclosure includes a panel-shaped component, an auxiliary component, and a wire. The panel-shaped component includes a panel body that is flat or curves in such a manner as to be convex outward. The auxiliary component is positioned inside the panel-shaped component and integrated with the panel-shaped component. The wire has a first end portion and a second end portion. The first end portion is bonded to a first point on an inner surface of the panel body. The second end portion is bonded to the auxiliary component. The wire is strained between the first point and the auxiliary component.

Another stiffened panel structure according to the present disclosure includes a panel-shaped component, a supporting member, and a wire. The panel-shaped component includes a panel body that is flat or curves in such a manner as to be convex outward. The supporting member projects from an inner surface of the panel body. The wire has a first end portion and a second end portion. The first end portion is bonded to a first point on the inner surface of the panel body. The second end portion is bonded to a second point on the inner surface of the panel body, the second point being opposed to the first point with the supporting member in between. The wire is strained between the first point and the second point via the supporting member.

Effect of Invention

The present disclosure provides a stiffened panel structure in which the panel-shaped component has sufficient surface quality and improved flare rigidity.

BRIEF DESCRIPTION OF DRAWINGS

FIG. 5 is a diagram showing the stiffened panel structure according to the first embodiment when a load is applied from outside to the panel-shaped component.

DESCRIPTION OF EMBODIMENTS

Figure 1:
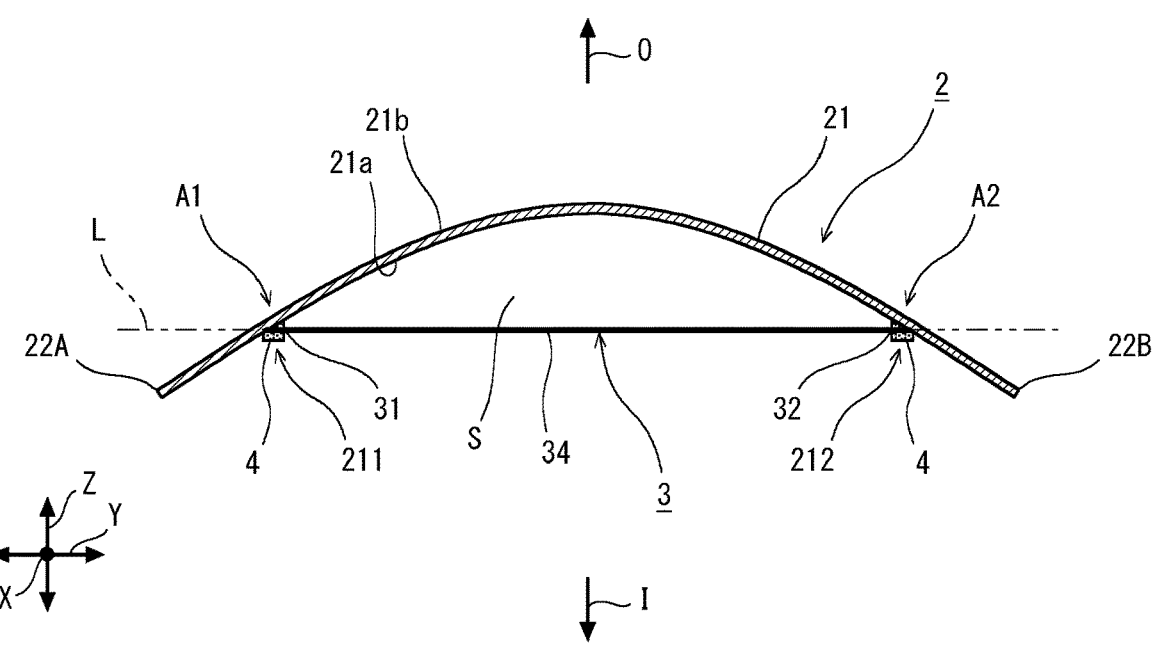
FIG. 1 is a sectional view of a stiffened panel structure according to a first embodiment.

Some embodiments of the present disclosure will hereinafter be described. In the following paragraphs, some embodiments of the present disclosure will be described by giving examples; however, the present disclosure is not limited to those examples. In the following paragraphs, specific values and materials may be given as examples; however, the present disclosure is not limited to those examples.

In order to attain the object above, the inventors conducted studies, and as a result, the inventors made the following findings.

Panel-shaped components are required to have high flare rigidity. Flare rigidity is evaluated based on the amount of elastic deformation of a panel-shaped component caused by application of a load thereto from outside. Specifically, when a load is applied to a panel body of a panel-shaped component from outside inward, the loaded part elastically deforms in the loading direction. The smaller the elastic deformation amount, the higher the flare rigidity.

Possible ways to enhance the flare rigidity of a panel-shaped component are increasing the sheet thickness of the panel-shaped component and attaching a reinforcing member to the panel body.

The flare rigidity of a panel-shaped component increases and decreases with the cube of the sheet thickness. Accordingly, if the sheet thickness is decreased for the purpose of weight saving, the flare rigidity greatly decreases. Even if the material is selected for the purpose of heightening the strength of the panel-shaped component, it is not so effective as to enhance the flare rigidity. It is because the flare rigidity is evaluated based on elastic deformation amount.

On the other hand, when a reinforcing member is bonded to the panel body, there are problems as described above.

As described above, in a conventional stiffened panel structure, a reinforcing member is bonded to the inner surface of the panel body in such a manner as to be entirely stuck to the panel body. In this case, the junction area between the panel body and the reinforcing member is large. When the junction area is large, the shape of the panel body greatly depends on the properties (coefficient of linear expansion, shape and size) of the reinforcing member. Accordingly, the panel body is likely to undergo plastic deformation depending on the properties of the reinforcing member.

Thus, it can be said that degradation of the surface quality of a panel-shaped component in a conventional stiffened structure is caused by a large junction area between a panel body and a reinforcing member. Then, it can be said that a small junction area between a panel body and a reinforcing member maintains the surface quality of the panel-shaped component. In order to decrease the junction area between a panel body and a reinforcing member, only end portions of the reinforcing member should be bonded to the panel body.

Stiffened panel structures according to embodiments of the present disclosure have been invented on the basis of the above-described findings.

A stiffened panel structure according to an embodiment of the present disclosure includes a panel-shaped component and a wire. The panel-shaped component includes a panel body that curves in such a manner as to be convex outward. The wire has a first end portion and a second end portion. The first end portion is bonded to a first point on the inner surface of the panel body. The second end portion is bonded to a second point on the inner surface of the panel body. The wire is strained between the first point and the second point. (This configuration will be referred to as first configuration.)

For the panel-shaped component of the stiffened panel structure with the first configuration, there is no particular requirement except having a panel body that curves in such a manner as to be convex outward. Typically, the panel-shaped component is an outer panel for an automobile. The outer panel is, for example, a door outer panel, a hood (bonnet), a roof, a fender, or the like.

There are no limits to the material of the wire. Typically, the wire is a metal wire. The material of the metal wire is not particularly limited. For example, the metal wire is a steel wire. The metal wire may be a single wire or a stranded wire. The wire may be a CFRP (carbon fiber reinforced plastic) wire. The CFRP wire may be a CFRP strand or a CFRP gut. The CFRP may be thermosetting CFRP that contains thermosetting resin (e.g., epoxy) as the base material or may be thermoplastic CFRP that contains thermoplastic resin (e.g., polyamide) as the base material. Preferably, closed-chain carbon fiber is used for the CFRP wire.

The diameter of the wire (metal wire, CFRP wire, or the like) is arbitrarily chosen according to the design requirements. When the wire has a non-circular cross-section, the diameter of a circle of which the area is equal to the cross-sectional area of the wire (equivalent diameter) is defined as the diameter of the wire. In order to suppress an increase in weight while securing sufficient rigidity of the wire, the diameter of the wire is desirably 0.3 mm to 3.0 mm. More desirably, the diameter of the wire is 1.1 mm to 2.5 mm.

In the stiffened panel structure with the first configuration, the first end portion of the wire is bonded to the first point of the panel body, and the second end portion of the wire is bonded to the second point of the panel body. Thus, the wire is bonded to the panel body at the first end portion and the second end portion. Then, the wire is strained between the first point and the second point. In this case, the wire extends linearly between the first point and the second point. The wire extending between the first point and the second point is out of contact with the inner surface of the panel body.

A panel body of a panel-shaped component installed in an automobile is likely to be subjected to a load from outside. In the following paragraphs, regarding a panel-shaped component, a point onto which a load is expected to be applied from outside will be referred to as "expected load point" in some cases. When a load is applied to the expected load point of a panel body, the panel body bends. Specifically, the expected load point of the panel body is displaced in the loading direction. In other words, the expected load point of the panel body is deformed inward. With the deformation of the expected load point, a part of the panel body that is off from the expected load point is deformed outward. This part will hereinafter be referred to as "outward deformation area". The outward deformation area is displaced in a direction that is opposite to the loading direction and away from the expected load point. In a sectional view of a panel-shaped component, there are outward deformation areas on both sides of the expected load point.

In the stiffened panel structure with the first configuration, the wire is strained between the first point and the second point. The first point and the second point are respectively in separated outward deformation areas. In this case, when a load is applied to the panel body, the wire is subjected to tensile force. At the same time, the first point and the second point of the panel body receive, from the wire, reaction force to the tensile force. This suppresses deformation of the panel body at the first point and the second point. With the suppression of deformation at the first point and the second point, deformation of the expected load point is suppressed. In this way, the flare rigidity of the panel-shaped component is enhanced. Thus, the wire functions as a kind of a reinforcing member.

In the stiffened panel structure with the first configuration, the wire, which functions as a reinforcing member, is bonded to the panel body only at the first end portion and the second end portion. Accordingly, the junction area between the panel body and the wire is small.

Therefore, in the stiffened panel structure with the first configuration, the shape of the wire does not affect the shape of the panel body so strongly as in a conventional stiffened panel structure in which a reinforcing member is entirely bonded to a panel body, and it is no longer necessary to strictly manage the dimensional accuracy of the wire (reinforcing member). When heat is applied to the panel body and the wire during aftertreatment or the like, the coefficient of linear expansion of the wire does not affect the shape of the panel body so strongly, regardless of whether the material of the wire and the material of the panel body are of the same kind or different kinds. Hence, the surface quality of the panel-shaped component can be maintained.

The stiffened panel structure with the first configuration is preferably configured as follows. The panel body includes an expected load point onto which a load is expected to be applied from outside, a first area, and a second area. Without the wire, the first area and the second area are expected to be displaced in directions opposite to a loading direction and away from the expected load point when a load is applied to the expected load point from outside. The second area is opposed to the first area with the expected load point in between. The first point is in the first area, and the second point is in the second area. (This configuration will be referred to as second configuration.)

In the stiffened panel structure with the second configuration, the first area and the second area correspond to the above-described outward deformation areas. In this case, the surface quality of the panel-shaped component can be maintained more certainly, and the flare rigidity of the panel-shaped component can be enhanced more.

A stiffened panel structure according to another embodiment of the present disclosure includes a panel-shaped component, an auxiliary component, and a wire. The panel-shaped component includes a panel body that is flat or curves in such a manner as to be convex outward. The auxiliary component is positioned inside the panel-shaped component and integrated with the panel-shaped component. The wire has a first end portion and a second end portion. The first end portion is bonded to a first point on an inner surface of the panel body. The second end portion is bonded to the auxiliary component. The wire is strained between the first point and the auxiliary component. (This configuration will be referred to as third configuration.)

In the stiffened panel structure with the third configuration, a panel-shaped component as used in the stiffened panel structure with the first configuration is usable as the panel-shaped component. In the stiffened panel structure with the third configuration, however, the panel body, to which the wire is bonded, curves in such a manner as to be convex outward or is flat.

For the auxiliary component, there is no particular requirement except being positioned inside the panel-shaped component and integrated with the panel-shaped component. For example, when the panel-shaped component is a door outer panel, the auxiliary component is a door inner panel, a door impact beam, or the like.

In the stiffened panel structure with the third configuration, a wire as used in the stiffened panel structure with the first configuration is usable as the wire.

In the stiffened panel structure with the third configuration, the first end portion of the wire is bonded to the first point of the panel body, and the second end portion of the wire is bonded to the auxiliary component. Thus, the wire is bonded to the panel body at the first end portion and is bonded to the auxiliary component at the second portion. Then, the wire is strained between the first point and the auxiliary component. In this case, as in the stiffened panel structure with the first configuration, the wire extends linearly between the first point and the auxiliary component. Moreover, the wire extending between the first point and the auxiliary component is out of contact with the inner surface of the panel body.

In the stiffened panel structure with the third configuration, the wire is strained between the first point and the auxiliary component. The first point is in the outward deformation area. Then, when a load is applied to the panel body, the wire is subjected to tensile force. Meanwhile, the first point of the panel body receives, from the wire, reaction force to the tensile force. This suppresses deformation of the panel body at the first point. With the suppression of the deformation at the first point, deformation of the expected load point is suppressed. In this way, the flare rigidity of the panel-shaped component is enhanced. Thus, in the stiffened panel structure with the third configuration also, the wire functions as a kind of a reinforcing member.

In the stiffened panel structure with the third configuration, the wire, which functions as a reinforcing member, is bonded to the panel body only at the first end portion and is bonded to the auxiliary component only at the second end portion. Accordingly, as in the stiffened panel structure with the first configuration, the junction area between the panel body and the wire is small. Therefore, the surface quality of the panel-shaped component can be maintained.

The stiffened panel structure with the third configuration is preferably configured as follows. The panel body includes an expected load point onto which a load is expected to be applied from outside, and a first area. Without the wire, the first area is expected to be displaced in a direction opposite to a loading direction and away from the expected load point when a load is applied to the expected load point from outside. The first point is in the first area. (This configuration will be referred to as fourth configuration.)

In the stiffened panel structure with the fourth configuration, the first area corresponds to the outward deformation area described above. In this case, the surface quality of the panel-shaped component can be maintained more certainly, and the flare rigidity of the panel-shaped component can be enhanced more.

A stiffened panel structure according to another embodiment of the present disclosure includes a panel-shaped component, a supporting member, and a wire. The panel-shaped component includes a panel body that is flat or curves in such a manner as to be convex outward. The supporting member projects from an inner surface of the panel body. The wire has a first end portion and a second end portion. The first end portion is bonded to a first point on the inner surface of the panel body. The second end portion is bonded to a second point on the inner surface of the panel body, the second point being opposed to the first point with the supporting member in between. The wire is strained between the first point and the second point via the supporting member. (This configuration will be referred to as fifth configuration.)

In the stiffened panel structure with the fifth configuration, a panel-shaped component as used in the stiffened panel structure with the first configuration is usable as the panel-shaped component. In the stiffened panel structure with the fifth configuration, however, the panel body, to which the wire is bonded, curves in such a manner as to be convex outward or is flat, as in the third configuration.

For the supporting member, there is no particular requirement except projecting from the inner surface of the panel body. For example, the supporting member is formed separately from the panel-shaped component and bonded to the panel body. Alternatively, the supporting member may be formed integrally with the panel-shaped component by pressing. There are no limits to the material of the supporting member. When the supporting member is formed separately from the panel-shaped component, the supporting member is, for example, made of plastic. Alternatively, the supporting member may be made of metal. In this case, the metal is steel, for example. The way of bonding the supporting member to the panel body is adhesive bonding, for example. The way of bonding may be welding or mechanical fastening. For example, when the panel-shaped component is a door outer panel and when the supporting member is formed integrally with the panel-shaped component, the supporting member may be a character line formed on the panel body.

In the stiffened panel structure with the fifth configuration, a wire as used in the stiffened panel structure with the first configuration is usable as the wire.

In the stiffened panel structure with the fifth configuration, the second point is opposed to the first point with the supporting member in between. In other words, the supporting member is located between the first point and the second point. The first end portion of the wire is bonded to the first point of the panel body, and the second end portion of the wire is bonded to the second point of the panel body. Thus, the wire is bonded to the panel body at the first end portion and the second end portion. Then, the wire is strained between the first point and the second point via the supporting member.

In the stiffened panel structure with the fifth configuration, the wire is strained between the first point and the second point via the supporting member. The first point and the second point are respectively in separate outward deformation areas. In this case, as in the stiffened panel structure with the first configuration, the wire is subjected to tensile force when a load is applied to the expected load point. Therefore, the flare rigidity of the panel-shaped component is enhanced.

In the stiffened panel structure with the fifth configuration, the junction area between the panel body and the wire is small, as in the stiffened panel structure with the first configuration. Therefore, the surface quality of the panel-shaped component can be maintained.

The stiffened panel structure with the fifth configuration is preferably configured as follows. The panel body includes an expected load point onto which a load is expected to be applied from outside, a first area, and a second area. Without the wire, the first area and the second area are expected to be displaced in directions opposite to a loading direction and away from the expected load point when a load is applied to the expected load point from outside. The second point is opposed to the first point with the expected load point in between. The first point is in the first area, and the second point is in the second area. The supporting member is positioned between the first area and the second area. (This configuration will be referred to as sixth configuration.)

In the stiffened panel structure with the sixth configuration, the first area and the second area correspond to the outward deformation areas described above. In this case, the surface quality of the panel-shaped component can be maintained more certainly, and the flare rigidity of the panel-shaped component can be enhanced more.

In the stiffened panel structure with any one of the first to sixth configurations, the panel-shaped component is preferably made of metal. (This configuration will be referred to as seventh configuration.) In the seventh configuration, the panel-shaped component is preferably made of steel. (This configuration will be referred to as eighth configuration.) However, the metal is not limited to steel. For example, the metal may be aluminum or magnesium.

In the stiffened panel structure with any one of the first to eighth configurations, the wire is preferably made of metal. (This configuration will be referred to as ninth configuration.) In the ninth configuration, the wire is preferably made of steel. (This configuration will be referred to as tenth configuration.)

In the stiffened panel structure with any one of the seventh to tenth configurations, the panel-shaped component and the wire are made of a same kind of material. (This configuration will be referred to as eleventh configuration.) In the stiffened panel structure with the eleventh configuration, the coefficient of linear expansion of the wire is the same as the coefficient of linear expansion of the panel body. Accordingly, the coefficient of linear expansion of the wire does not affect the shape of the panel body. Therefore, the surface quality of the panel-shaped component can be maintained more certainly.

In the stiffened panel structure with any one of the first to seventh configurations, the wire is a CFRP wire. (This configuration will be referred to as twelfth configuration.) The wire preferably has a high Young's modulus. The high Young's modulus of the wire increases the effect to enhance the flare rigidity.

In the stiffened panel structure with any one of the first to twelfth configurations, the panel-shaped component is preferably an outer panel for an automobile. (This configuration will be referred to as thirteenth configuration.) In the thirteenth configuration, the panel-shaped component, which is an outer panel, is a door outer panel, a hood, a roof or a fender, for example.

In any of the above-described stiffened panel structures, the way of bonding the first end portion of the wire to the panel body and the way of bonding the second end portion of the wire to the panel body or the auxiliary component are preferably adhesive bonding. This is because adhesive bonding does not affect the appearance of the panel body. However, the way of bonding may be welding or mechanical fastening.

When a heat treatment (for example, baking finishing) is applied to the panel-shaped component, the bonding between the panel body and the wire may be carried out before the heat treatment or after the heat treatment. However, when the wire is a CFPR wire, in view of the difference in thermal expansion, it is preferred that the bonding between the panel body and the wire is carried out after the heat treatment.

With reference to the drawings, stiffened panel structures according to some embodiments of the present disclosure will be described with some specific examples. The parts that are the same or correspond to each other are provided with the same reference signs, and descriptions of those parts will not be repeated.

First Embodiment

With reference to FIGS. 1 to 5, a stiffened panel structure 1, in which a panel-shaped component 2 is stiffened, according to a first embodiment will be described. In the stiffened panel structure 1, the panel-shaped component 2 is an outer panel for an automobile. The outer panel may be a door outer panel, a hood, a roof, a fender, or the like. In the present specification, in order to indicate the directions of the stiffened panel structure 1 with the panel-shaped component 2, X direction, Y direction and Z direction that are orthogonal to one another will be used in some cases. In planar view of the panel-shaped component 2, X direction and Y direction are directions in which the panel-shaped component 2 is stretched. Z direction is a direction perpendicular to the directions in which the panel-shaped component 2 is stretched, and the outside O and inside I of the panel-shaped component 2 are defined with respect to Z direction.

Figure 2:
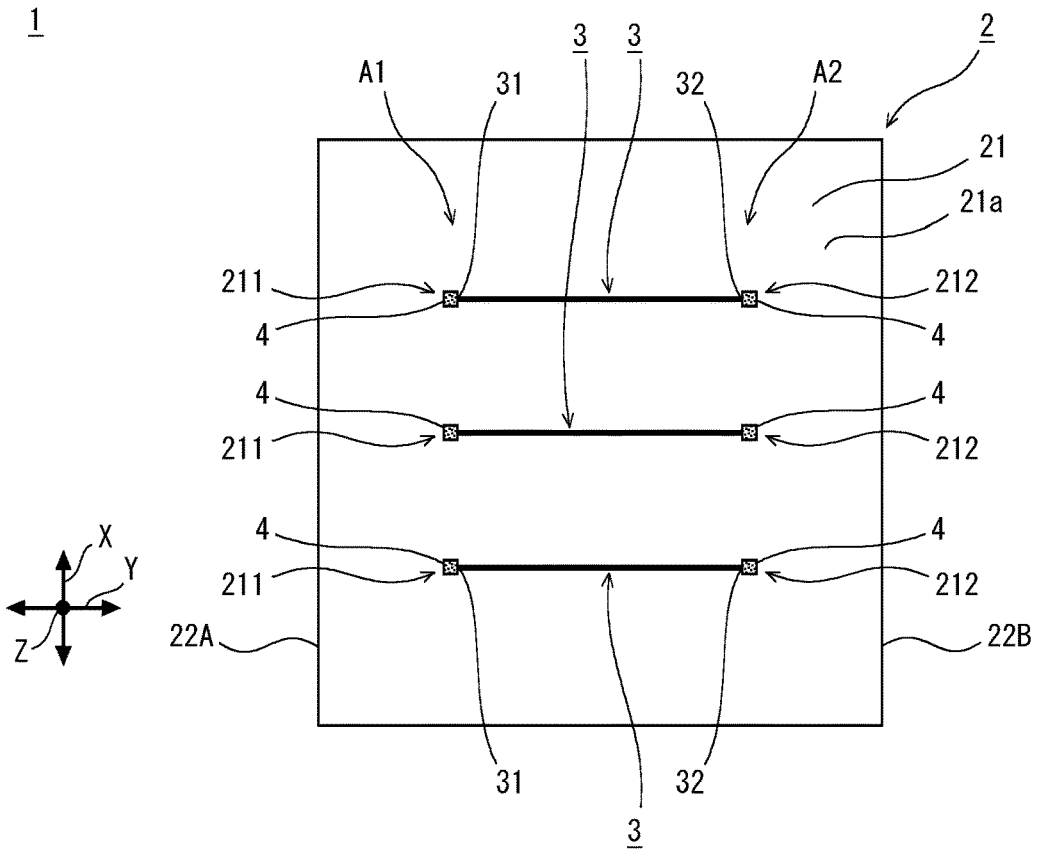
FIG. 2 is a plan view of the stiffened panel structure according to the first embodiment.

FIGS. 1 and 2 are diagrams showing the stiffened panel structure 1, in which the panel-shaped component 2 is stiffened, according to the first embodiment. FIG. 1 is a sectional view of the stiffened panel structure 1 when the panel-shaped component 2 is cut in a plane perpendicular to X direction. FIG. 2 is a plan view of the stiffened panel structure 1 when the panel-shaped component 2 shown in FIG. 1 is viewed from inside I.

As shown in FIGS. 1 and 2, the stiffened panel structure 1 includes a panel-shaped component 2 and one or more wires 3. In the present embodiment, the number of wires 3 is three. However, the number of wires 3 is not limited to three, and the number of wires 3 may be one, two, three or more.

(Panel-Shaped Component 2)

In the present embodiment, the panel-shaped component 2 is rectangular in planar view from Z direction. The panel-shaped component 2 includes a panel body 21. The panel-shaped component 2 has a first lateral edge 22A at one end of the panel body 21 in Y direction. The panel-shaped component 2 has a second lateral edge 22B at the other end of the panel body 21 in Y direction.

The panel-shaped component 2 is formed from a metal sheet. Specifically, the panel-shaped component 2 is formed from a steel sheet. The center portion of the panel body 21 with respect to Y direction is formed into a curved surface projecting outward O. Thus, the panel body 21 curves in such a manner as to be convex outward O. The cross-sectional shape of the panel body 21 is like a circular arc. However, the cross-sectional shape of the panel body 21 needs to be only a convex curve projecting outward O and may be shaped like an elliptic arc or any other convex curve. The cross-section of the panel body 21 shown in FIG. 1 is drawn with some exaggeration. In the other drawings also, some exaggeration is included.

(Wires 3)

The wires 3 are made of metal, that is, are metal wires. Specifically, the wires 3 are made of steel, that is, are steel wires. Each of the wires 3 is a single wire that is a single wire rod. However, each of the wires 3 may be a twisted wire of a plurality of wire rods. Each of the wires 3 is a slender linear member. For example, each of the wires 3 has a diameter of 2.0 mm. It is preferred that each of the wires 3 has a diameter within the range of 0.3 to 3.0 mm.

Each of the wires 3 extends in Y direction of the panel body 21. Specifically, each of the wires 3 lies in the range of the circular arc drawn by the cross-section of the panel body 21 and extends in Y direction from the first lateral edge 22A toward the second lateral edge 22B. The three wires 3 are arranged side by side in X direction in an equidistant manner (see FIG. 2).

Each of the wires 3 has a first end portion 31 and a second end portion 32. Among opposite end portions of the wire 3, one end portion is the first end portion 31, and the other end portion is the second end portion 32. The first end portion 31 is bonded to a first point 211 on the inner surface 21*a* of the panel body 21 by an adhesive 4. The second end portion 32 is bonded to a second point 212 on the inner surface 21*a* of the panel body 21 by the adhesive 4. The first point 211 is away from the second point 212 in Y direction of the panel body 21.

Figure 3:
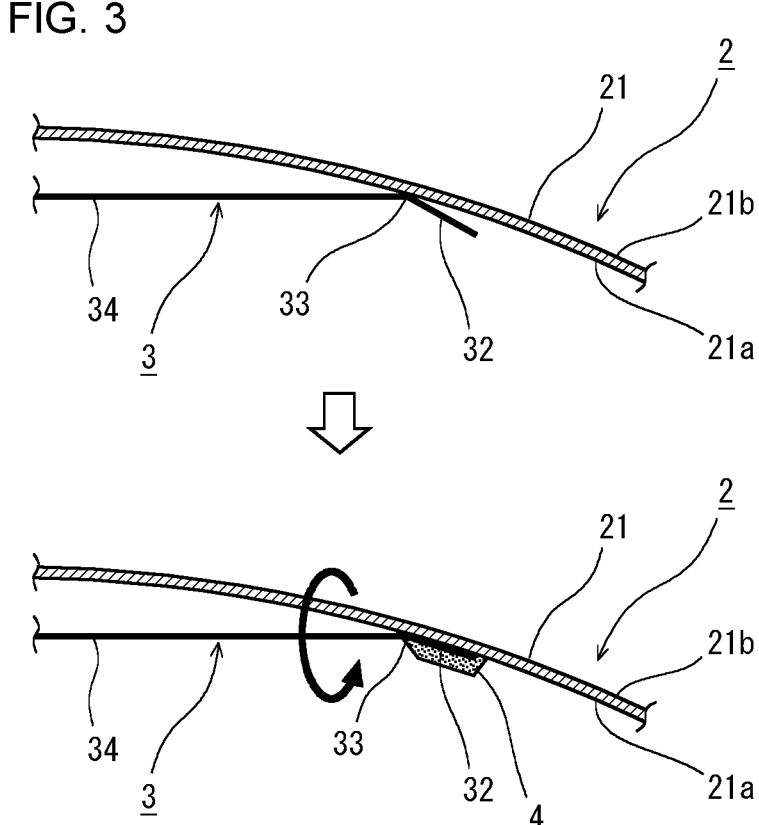
FIG. 3 is a diagram showing the way of attaching each wire to a panel body in the stiffened panel structure according to the first embodiment.

FIG. 3 is a diagram showing the way of attaching each wire 3 to the panel body 21 in the stiffened panel structure 1 according to the present embodiment. The upper section of FIG. 3 shows a state before bonding, and the lower section of FIG. 3 shows a state after bonding. FIG. 3 shows the second end portion 32 of the wire 3 as an example.

As shown in the upper section of FIG. 3, for the attachment of each of the wires 3 to the panel body 21, the wire 3 is bent at the respective bases 33 of the first end portion 31 and the second end portion 32. Each of the bases 33 is brought into contact with the inner surface 21*a* of the panel body 21. Then, as shown in the lower section of FIG. 3, the wire 3 is turned around the axis of the wire body 34 in the direction shown by arrow. Thereby, the first end portion 31 and the second end portion 32 of the wire 3 are stuck to the inner surface 21*a* of the panel body 21.

In this state, the adhesive 4 is supplied to the first end portion 31 and the second end portion 32 of the wire 3. The first end portion 31 and the second end portion 32 of the wire 3 are fixed by the hardened adhesive 4. In this way, the first end portion 31 and the second end portion 32 are bonded to the panel body 21.

The way of attaching the wires 3 to the panel body 21 is not limited to the way of attaching shown in FIG. 3. In order to enhance the junction strength, for example, each of the first end portion 31 and the second end portion 32 may be formed into a swirl preliminarily. When an adhesive is used for the bonding, any imprints of bonding that degrade appearance do not appear on the outer surface 21*b* of the panel body 21. In terms of appearance, it is preferred that an adhesive is used for the bonding. However, when the outer surface 21*b* of the panel body 21 is finally covered with another member, welding or mechanical fastening may be adopted as the way of bonding because it is not necessary to worry about the appearance of the panel body 21.

When a heating treatment (for example, baking finishing) is applied to the panel-shaped component 2, it does not matter whether the wires 3 are bonded to the panel body 21 before the heat treatment or after the heat treatment.

As shown in FIG. 1, the first end portion 31 of each of the wires 3 is bonded to the first point 211, and the second end portion 32 of each of the wires 3 is bonded to the second point 212. Thus, each of the wires 3 is bonded to the panel body 21 at the first end portion 31 and the second end portion

32. Then, each of the wires 3 is strained between the first point 211 and the second point 212.

In this case, the wire body 34 of each of the wires 3 extends on an imaginary line L passing through the first point 211 and the second point 212. Thus, each of the wires 3 extends linearly between the first point 211 and the second point 212. The wire body 34 extending between the first point 211 and the second point 212 is out of contact with the inner surface 21*a* of the panel body 21. There is a space S between the wire body 34 and the panel body 21.

Figure 4A:
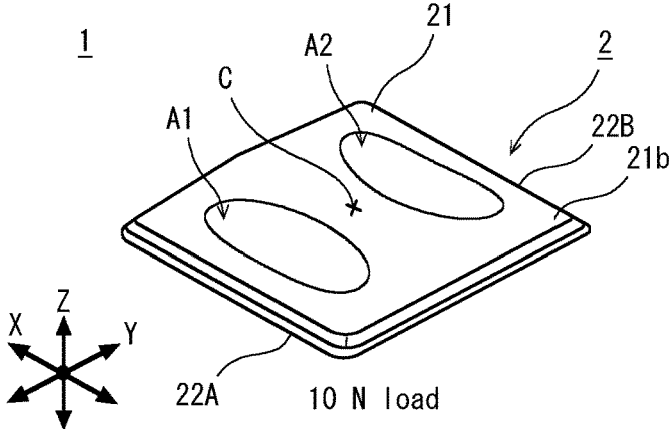
FIG. 4A is a perspective view of a panel-shaped component with no wires attached thereto when a load is applied to the panel-shaped component.
Figure 4B:
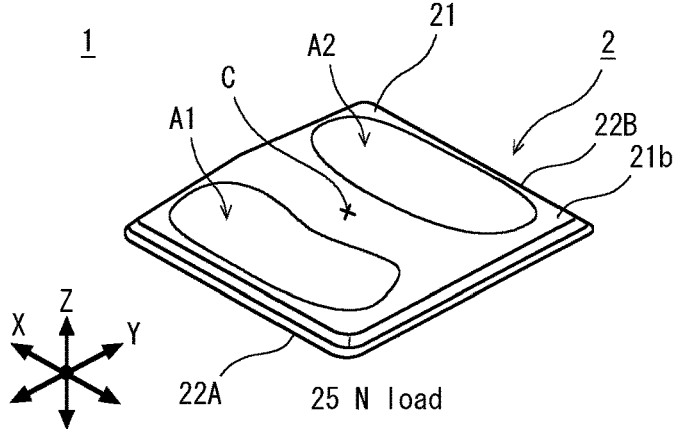
FIG. 4B is a perspective view of a panel-shaped component with no wires attached thereto when a load is applied to the panel-shaped component.
Figure 4C:
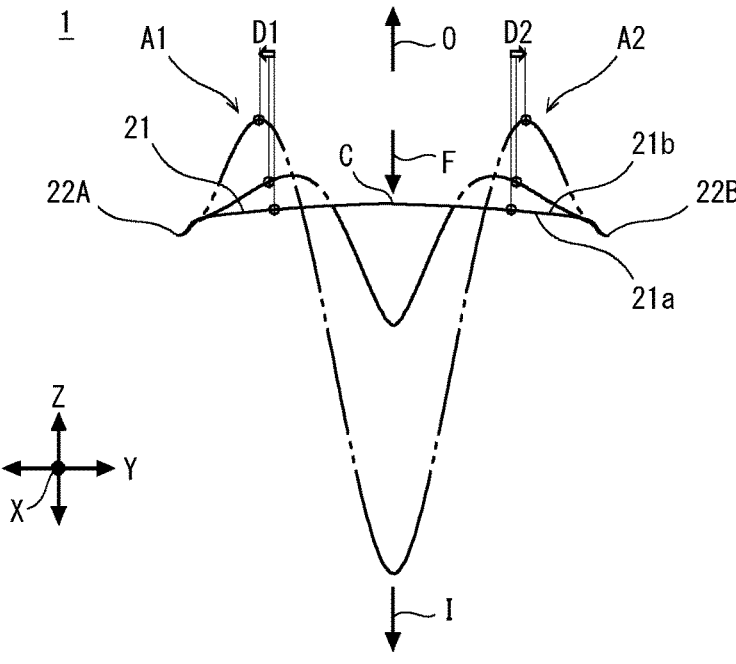
FIG. 4C is a diagram showing deformation behaviors of a panel body with no wires attached thereto when a load is applied to the panel-shaped component.

FIGS. 4A to 4C are diagrams showing deformation behaviors that the panel body 21 without the wires 3 attached thereto is expected to exhibit when a load F is applied to the panel-shaped component 2 from outside O. FIGS. 4A and 4B are perspective views of the panel-shaped component 2. FIG. 4C is a sectional view of the panel-shaped component 2 when the panel-shaped component 2 is cut in a plane perpendicular to X direction. These figures show results (simulation models and values) of CAE (Computer Aided Engineering) analysis.

Regarding the panel-shaped component 2 shown in FIGS. 4A to 4C, the center C of the panel body 21 with respect to X direction and Y direction projects most outward O. The stiffened panel structure 1 according to the first embodiment is expected to be subjected to a load F applied to the center C of the panel body 21 from the outer surface 21*b* toward the inner surface 21*a* of the panel body 21. Thus, the center C of the panel body 21 is an expected load point as described above. When the load F is applied to the center C (expected load point) of the panel body 21 from outside O, the panel body 21 bends. The CAE analysis was conducted with the load F set to two values, 10 N and 25 N.

FIGS. 4A and 4B show that areas A1 and A2 were deformed outward O when a load F was applied to the center C (expected load point) of the panel body 21. The areas A1 and A2 were displaced along Z direction. In other words, the areas A1 and A2 were displaced in the opposite direction to the direction of load F. Further, the areas A1 and A2 were displaced along Y direction. In other words, the areas A1 and A2 were displaced in directions away from the center C.

FIG. 4C shows the amounts of displacements of various points of the panel body 21, and the amounts shown in FIG. 4C were magnified a hundred times the values obtained as the analysis results. In FIG. 4C, the solid line shows the state before the application of load F. The alternate long and dash line shows the state when a load F of 10 N was applied. The alternate long and two short dashes line shows the state when a load F of 25 N was applied.

As shown in FIG. 4C, when a load F is applied to the center C (expected load point) of the panel body 21 from outside O, the center C is displaced in the direction of load F. In other words, the center C is displaced toward the inside I of the panel body 21.

With the displacement of the center C, the areas A1 and A2, which are away from the center C in Y direction, are deformed toward the outside O of the panel body 21. Thus, the areas A1 and A2 are displaced in a direction that is opposite to the direction of load F and away from the center C. Therefore, the areas A1 and A2 are outward deformation areas as described above. The area A1 is near the first lateral edge 22A of the panel-shaped component 2. The area A2 is near the second lateral edge 22B of the panel-shaped component 2. In a sectional view of the panel-shaped component 2, the areas A1 and A2 are on both sides of the center C. In other words, the area A2 lies on the side opposite to the area A1 with the center C (expected load point) in between. As shown in FIGS. 4A to 4C, the ranges of the areas A1 and A2 when the load F was 25 N were larger than the ranges of the areas A1 and A2 when the load F was 10 N.

The areas A1 and A2 determined by the CAE analysis indicate outward deformation areas. Without the wires 3, when a load F is applied to the center C (expected load point) of the panel-shaped component 2 from outside O, the outward deformation areas are displaced in directions that are opposite to the direction of load F and away from the center C. In this specification, the area A1, which is an outward deformation area near the first lateral edge 22A of the panel body 21, will be referred to as first area A1 in some cases. The area A2, which is an outward deformation area near the second lateral edge 22B of the panel body 21, will be referred to as second area A2 in some cases.

As shown in FIG. 4C, the amounts of lateral displacements (displacements in Y direction) of the first area A1 and the second area A2 due to the application of load F of 25 N were greater than those due to the application of load F of 10 N. The first area A1 near the first lateral edge 22A of the panel-shaped component 2 is displaced in a first deformation direction D1 toward the first lateral edge 22A. At the same time, the second area A2 near the second lateral edge 22B of the panel-shaped component 2 is displaced in a second deformation direction D2 toward the second lateral edge 22B. Thus, the first area A1 and the second area A2 are displaced in directions away from the center C (expected load point) of the panel body 21 with respect to Y direction.

As shown in FIG. 1, the respective first end portions 31 of the wires 3 are bonded to first points 211 of the panel body 21, and the respective second end portions 32 of the wires 3 are bonded to second points 212 of the panel body 21. The first points 211 are in the first area A1, and the second points 212 are in the second area A2. Accordingly, the first points 211 to which the respective first end portions 31 of the wires 3 are bonded and the second points 212 to which the respective second end portions 32 are bonded are in outward deformation areas.

Each of the wires 3 extends linearly in Y direction between the first point 211 (in the first area A1) and the second point 212 (in the second area A2).

In the present embodiment, the first area A1 and the second area A2, which are outward deformation areas, are determined from a CAE analysis. However, the way to determine outward deformation areas is not limited to a CAE analysis. For example, a panel-shaped component 2 without any wires 3 attached thereto may be subjected to a test in which a load F is applied thereto, and outward deformation areas may be determined based on the test results.

(Function and Effect)

The function and the effect of the stiffened panel structure 1 will be described below.

The respective first end portions 31 of the wires 3 are bonded to first points 211 of the panel body 21, and the respective second end portions 32 of the wires 3 are bonded to second points 212 of the panel body 21. The first points 211 and the second points 212 are in outward deformation areas (first area A1 and second area A2), respectively, which are away from each other. Then, each of the wires 3 is strained between the first point 211 and the second point 212. Each of the wires 3 extends linearly in Y direction along an imaginary line L.

Figure 5:
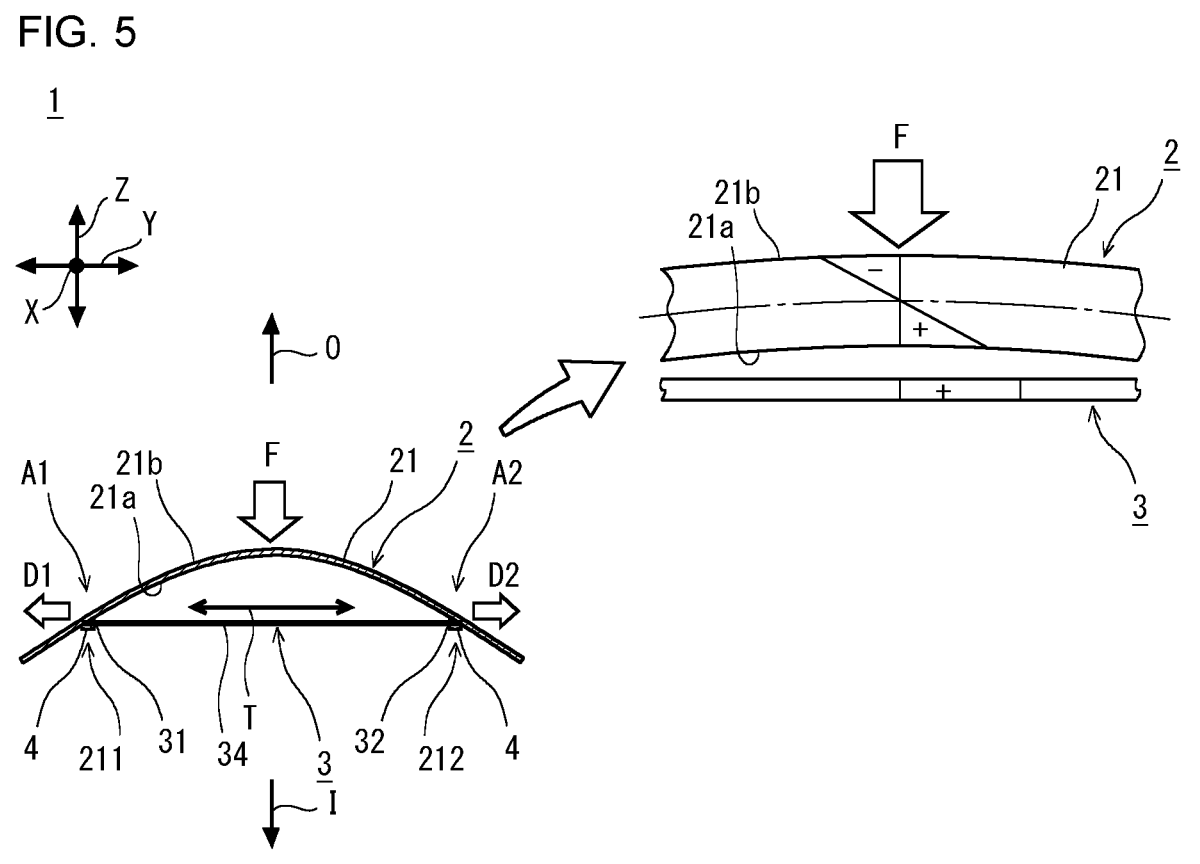

FIG. 5 is a diagram showing a stiffened panel structure 1 according to the present embodiment in a state in which a load F is applied to the panel-shaped component 2 from outside O. The left side of FIG. 5A is a cross-sectional view of the panel-shaped component 2, and the right side of FIG.

5 is an enlarged view showing the point on which the load F is applied and a part around it.

As shown in FIG. 5, when a load F is applied to the panel body 21, the panel body 21 bends. In this case, the first area A1 and the second area A2 of the panel body 21 are deformed outward, and with the deformation, the wires 3 are subjected to tensile force T. At the same time, the panel body 21 receives, from the wires 3, reaction force to the tensile force T on the first points 211 and the second points 212. This suppresses deformation of the panel body 21 at the first points 211 and the second points 212. The suppression of deformation of the panel body 21 at the first points 211 and the second points 212 makes it possible to suppress deformation of the first area A1 and the second area A2 of the panel body 21. Thus, deformation of the outward deformation areas can be suppressed. Then, deformation of the expected load point of the panel body 21 due to a load F applied thereto can be suppressed. Accordingly, the flare rigidity of the panel-shaped component 2 can be enhanced. Hence, the wires 3 function as reinforcing members.

The wire bodies 34 extending between the respective first points 211 and the respective second points 212 are out of contact with the inner surface 21a of the panel body 21. In other words, each of the wires 3, which functions as a reinforcing member, is bonded to the panel body 21 only at its first end portion 31 and its second end portion 32. Accordingly, the junction area between the panel body 21 and each of the wires 3 is small.

Therefore, as compared with a conventional stiffened panel structure in which a reinforcing member is entirely stuck to the panel body 21, even if the dimensional accuracy of each of the wires 3 (reinforcing member) is not strictly managed, the shapes of the wires 3 do not have so large an effect on the panel body 21. When the panel-shaped component 2 and the wires 3 are subjected to a heat treatment (e.g., baking finishing), the coefficient of linear expansion of the wires 3 do not have so large an effect on the shape of the panel body 21, regardless of whether the material of the wires 3 and the material of the panel-shaped component 2 are of the same kind or different kinds. Thus, the surface quality of the panel-shaped component 2 can be maintained.

In the present embodiment, the panel-shaped component 2 is made of metal (specifically, steel), and the wires 3 are made of metal (specifically, steel). Thus, the panel-shaped component 2 is made of the same kind of material as the wires 3 that are bonded to the panel body 21 of the panel-shaped component 2. In this case, the coefficient of linear expansion of the wires 3 is the same as the coefficient of linear expansion of the panel body 21. Therefore, the coefficient of linear expansion of the wires 3 has no effect on the shape of the panel body 21. Accordingly, the surface quality of the panel-shaped component 2 can be maintained more certainly.

As described above, in the stiffened panel structure 1 according to the present embodiment, the surface quality of the panel-shaped component 2 can be maintained, and the flare rigidity of the panel-shaped component 2 can be enhanced.

In the present embodiment, the panel body 21 curves in such a manner as to be convex outward O. Thus, the panel body 21 does not curve in such a manner as to be concave to the outside O. For effective use of the present embodiment, in a sectional view of the panel body 21, the radius of curvature R of the convex curve is preferably 100 mm or more.

Japanese Patent Application Publication No. 2008-68757 discloses a method of enhancing flare rigidity by attaching a tensile force applying jig inside of a door outer panel.

According to this method of enhancing flare rigidity, a tensile force applying jig is set in a door outer panel, the coefficient of linear expansion of the tensile force applying jig being higher than that of the door outer panel, and the panel is thermally distorted during a painting process and thereby plastically deformed. In this way, the rigidity of the door outer panel after detachment of the tensile force applying jig is improved.

Thus, according to this method of enhancing flare rigidity, after the painting process, the tensile force applying jig is detached from the door outer panel. Accordingly, it never happens that the door outer panel is subjected to a load while the tensile force applying jig is attached thereto.

Since the method of enhancing flare rigidity has a step of detaching the tensile force applying jig after the painting process, the way of attaching the tensile force applying jig is a set-in method. Therefore, if the door outer panel is subjected to a load while the tensile force applying jig is attached thereto, a gap will be made in the set-in portion, and the tensile force applying jig will come out.

On the other hand, in the stiffened panel structure 1 of the present embodiment, the respective first end portions 31 and the respective second end portions 32 of the wires 3 are bonded to the panel body 21. Accordingly, the wires 3 enhance the flare rigidity of the panel-shaped component 2.

Second Embodiment

Figure 6:
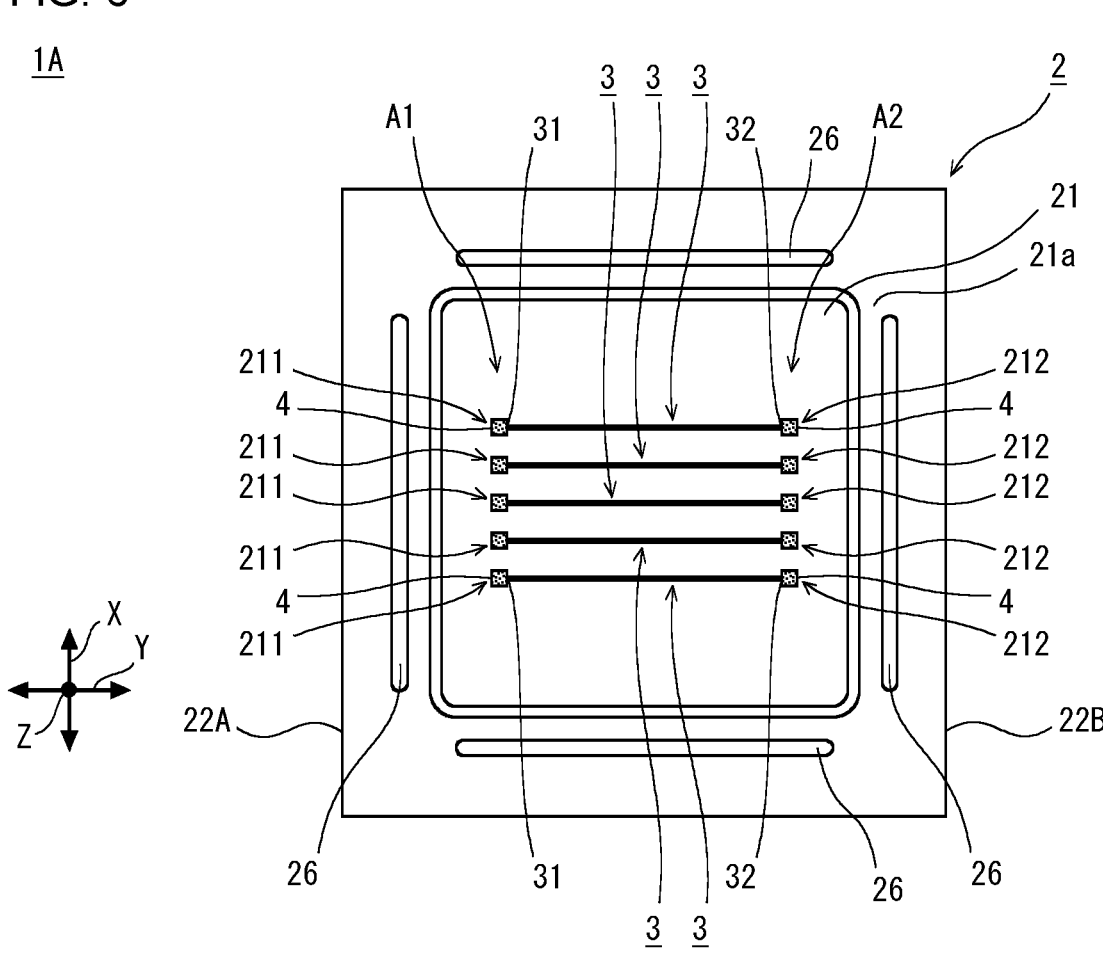
FIG. 6 is a plan view of a stiffened panel structure according to a second embodiment.

FIG. 6 shows a stiffened panel structure 1A, in which a panel-shaped component 2 is stiffened, according to a second embodiment. FIG. 6 is a plan view of the stiffened panel structure 1A when the panel-shaped component 2 is viewed form inside I. The stiffened panel structure 1A of the second embodiment is a modification of the stiffened panel structure 1 of the first embodiment. The second embodiment will hereinafter be described mainly with respect to differences from the first embodiment.

In the stiffened panel structure 1A of the present embodiment, the panel-shaped component 2 is rectangular in planar view from Z direction. Along the four sides of the panel-shaped component 2, which define the outline of the panel-shaped component 2, beads 26 are formed. The beads 26 are formed outside the panel body 21.

In the same way as in the first embodiment, wires 3 are attached to the panel body 21. In the present embodiment, however, the number of wires 3 is five. These five wires 3 are arranged side by side in X direction in an equidistant manner. The panel-shaped component 2 is stiffened by these five wires 3. In this case, as compared with the stiffened panel structure of the first embodiment, the flare rigidity of the panel-shaped component 2 becomes higher with the increase in the number of wires 3.

Third Embodiment

Figure 7:
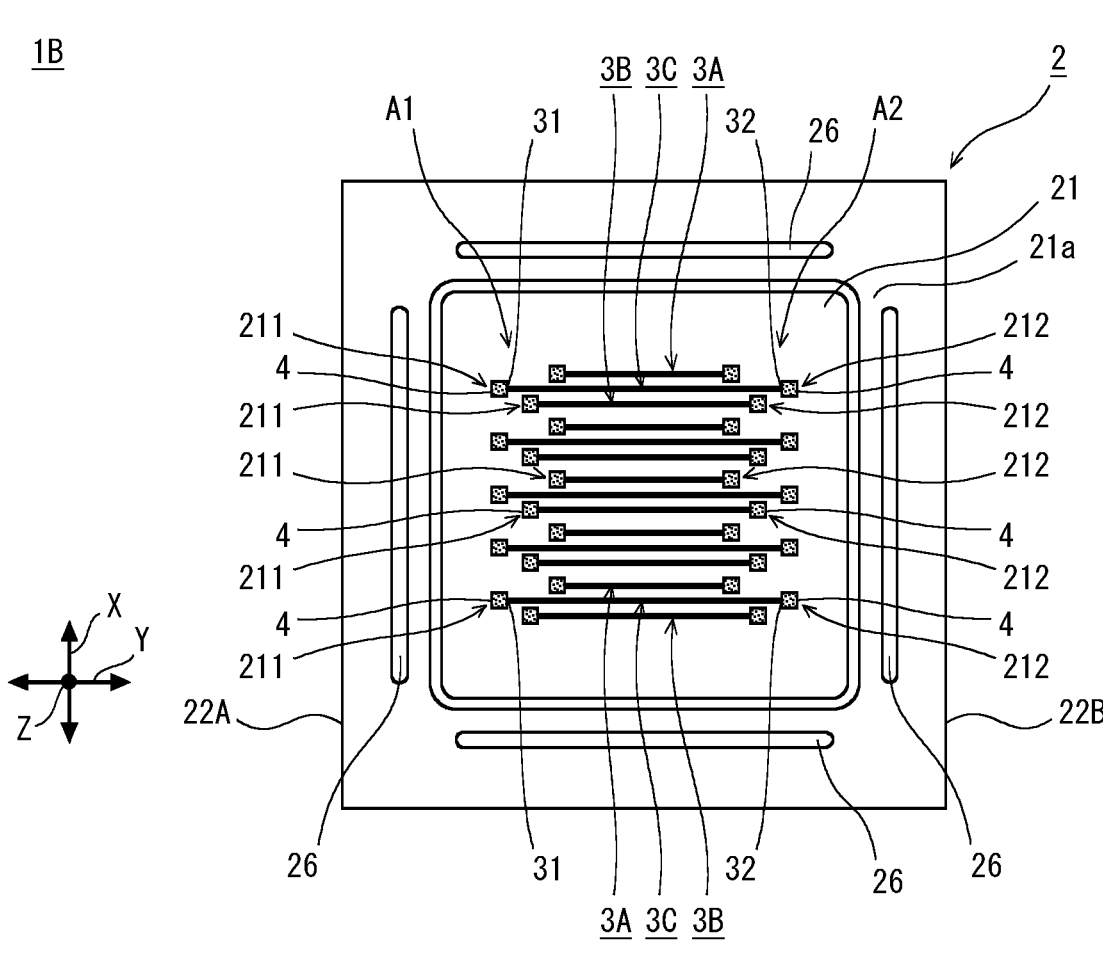
FIG. 7 is a plan view of a stiffened panel structure according to a third embodiment.

FIG. 7 shows a stiffened panel structure 1B, in which a panel-shaped component 2 is stiffened, according to a third embodiment. FIG. 7 is a plan view of the stiffened panel structure 1B when the panel-shaped component 2 is viewed from inside I. The stiffened panel structure 1B of the third embodiment is a modification of the stiffened panel structure 1A of the second embodiment. The third embodiment will hereinafter be described mainly with respect to differences from the second embodiment.

In the stiffened panel structure 1B of the present embodiment, the number of wires 3 attached to the panel body 21 is fifteen. The panel-shaped component 2 is stiffened by the fifteen wires 3. In this case, as compared with the stiffened panel structures of the first embodiment and the second embodiment, the flare rigidity of the panel-shaped component 2 becomes higher with the increase in the number of wires 3.

In the stiffened panel structure 1B of the present embodiment, the wires 3 include three kinds that are different in length, namely, first wires 3A, second wires 3B, and third wires 3C. The first wires 3A are the shortest kind of these three kinds of wires 3. The second wires 3B have a length longer than the length of the first wires 3A. The third wires 3C are the longest kind. The first wires 3A, the second wires 3B and the third wires 3C are arranged side by side in X direction in this order one after another.

(First Load Test)

Figure 8:
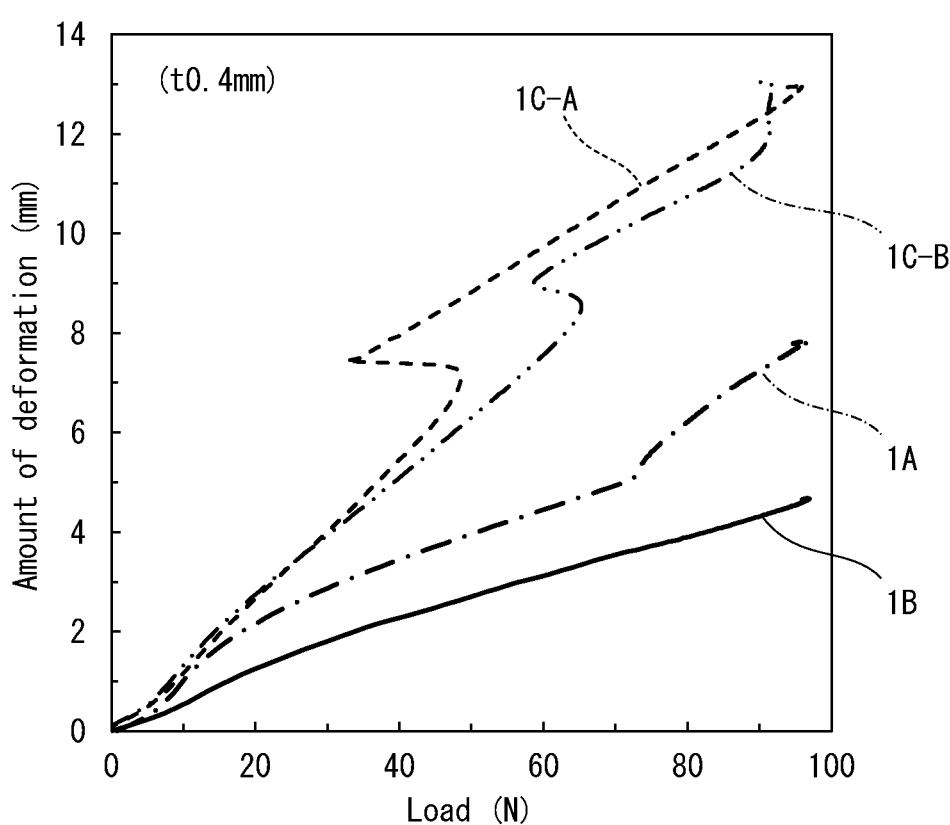
FIG. 8 is a chart showing results of a first load test on the stiffened panel structures of the second and third embodiments.

FIG. 8 is a chart showing results of a first load test on the stiffened panel structures of the second and third embodiments. FIG. 8 shows the relationship between the load applied to the panel-shaped component and the amount of deformation of the panel-shaped component. The amount of deformation means the amount of displacement of the point of the panel body onto which the load was applied (the amount of displacement of the expected load point).

For the first load test, the stiffened panel structure 1A, in which a panel-shaped component 2 is stiffened, of the second embodiment and the stiffened panel structure 1B, in which a panel-shaped component 2 is stiffened, of the third embodiment were prepared. In the stiffened panel structure 1A of the second embodiment, the number of wires 3 was five. In the stiffened panel structure 1B of the third embodiment, the number of wires 3 was fifteen. For comparison, further, non-stiffened panel structures 1C, that is, panel-shaped components 2 with no wires attached thereto were prepared. Each of the panel-shaped components 2 was subjected to a load, and the amount of deformation was measured.

The principal conditions of the test that was conducted on the stiffened panel structures 1A and 1B, and the non-stiffened panel structures 1C were as follows.

The material of the panel-shaped components 2 was a cold-rolled steel sheet for automotive use JSC270D according to Japan Iron and Steel Federation Standards (JFS). The sheet thickness of the panel-shaped components 2 was 0.4 mm. Each of the panel-shaped components 2 was rectangular in planar view from Z direction, and the sides defining the outline of the panel-shaped component 2 was each 400 mm in length. In a cross-section of the panel body 21, the radius of curvature R of the convex curve was 1200 mm.

The material of the wires 3 was rolled steel for general structure SS400 (JIS G 3101). Each of the wires 3 was a single wire and had a diameter of 2.0 mm. In the stiffened panel structure 1A of the second embodiment, the wires 3 had a length of 275 mm. In the stiffened panel structure 1B of the third embodiment, the third wires 3C had a length of 275 mm, the second wires 3B had a length of 210 mm, and the first wires 3A had a length of 160 mm.

A low-odorousness acrylic adhesive Y-600 made by Cemedine Co., Ltd. was used as the adhesive 4 for bonding between the wires 3 and the panel-shaped components 2.

Two panel-shaped components 2 were subjected to the test as the non-stiffened panel structures 1C. In FIG. 8, 1C-A shows results of the test that was conducted on one of the panel-shaped components 2 prepared as the non-stiffened panel structures 1C, and 1C-B shows results of the test that was conducted on the other of the panel-shaped components 2 prepared as the non-stiffened panel structures 1C.

As shown in FIG. 8, the amount of deformation of the panel-shaped component 2 in the stiffened panel structure 1A of the second embodiment was smaller than the amount of deformation of any of the panel-shaped components 2 of the non-stiffened panel structures 1C (1C-A and 1C-B). Further, the amount of deformation of the panel-shaped component 2 in the stiffened panel structure 1B of the third embodiment was smaller than the amount of deformation of the panel-shaped component 2 in the stiffened panel structure of the second embodiment.

(Second Load Test)

Figure 9:
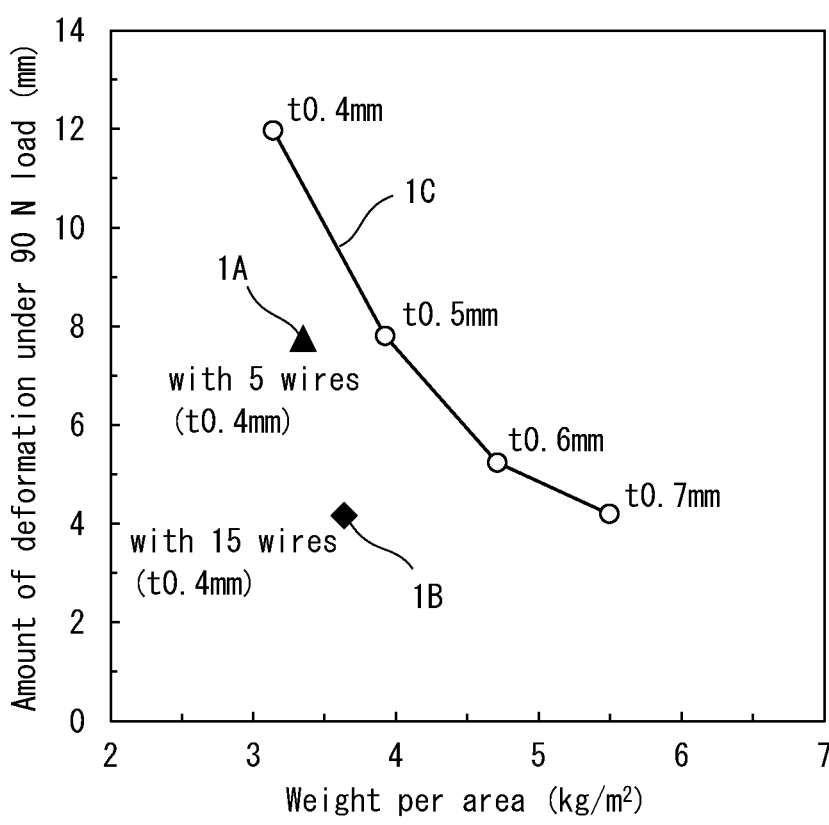
FIG. 9 is a chart showing results of a second load test on the stiffened panel structures of the second and third embodiments.

FIG. 9 is a chart showing results of a second load test on the stiffened panel structures of the second and third embodiments. FIG. 9 shows the relationship between the weight per unit area of the panel-shaped component and the amount of deformation of the panel-shaped component. As in the first load test, the amount of deformation means the amount of displacement of the point of the panel body onto which the load was applied (the amount of displacement of the expected load point).

For the second load test, the stiffened panel structure 1A, in which a panel-shaped component 2 is stiffened, of the second embodiment and the stiffened panel structure 1B, in which a panel-shaped component 2 is stiffened, of the third embodiment were prepared. In the stiffened panel structure 1A of the second embodiment, the number of wires 3 was five. In the stiffened panel structure 1B of the third embodiment, the number of wires 3 was fifteen. For comparison, further, non-stiffened panel structures 1C, that is, panel-shaped components 2 with no wires attached thereto were prepared. A load of 90 N was applied to each of the panel-shaped components 2, and the amount of deformation was measured.

The conditions of the second test were different from the conditions of the first test in the following points. Four panel-shaped components 2 were subjected to the test as the non-stiffened panel structures 1C, and the four panel-shaped components 2 were different in sheet thickness t. The sheet thicknesses t of these four panel-shaped components 2 were 0.4 mm, 0.5 mm, 0.6 mm and 0.7 mm, respectively. The sheet thicknesses t of the stiffened panel structure 1A of the second embodiment and the stiffened panel structure 1B of the third embodiment were both 0.4 mm as in the first load test.

As shown in FIG. 9, as compared with the non-stiffened panel structure 1C that was composed only of the panel-shaped component 2 with a sheet thickness t of 0.5 mm, the stiffened panel structure 1A of the second embodiment had a smaller weight per unit area and had a slightly smaller amount of deformation. As compared with the non-stiffened panel structure 1C that was composed only of a panel-shaped component 2 with a sheet thickness t of 0.5 mm, the stiffened panel structure 1B of the third embodiment had a smaller weight per unit area and had a much smaller amount of deformation. Moreover, as compared with the non-stiffened panel structure 1C that was composed only of a panel-shaped component 2 with a sheet thickness t of 0.7 mm, the stiffened panel structure 1B of the third embodiment had a much smaller weight per unit area and had a slightly smaller amount of deformation. As compared with the stiffened panel structure 1A of the second embodiment, the stiffened panel structure 1B of the third embodiment had a slightly greater weight per unit area because of the larger number of wires 3.

Fourth Embodiment

Figure 10:
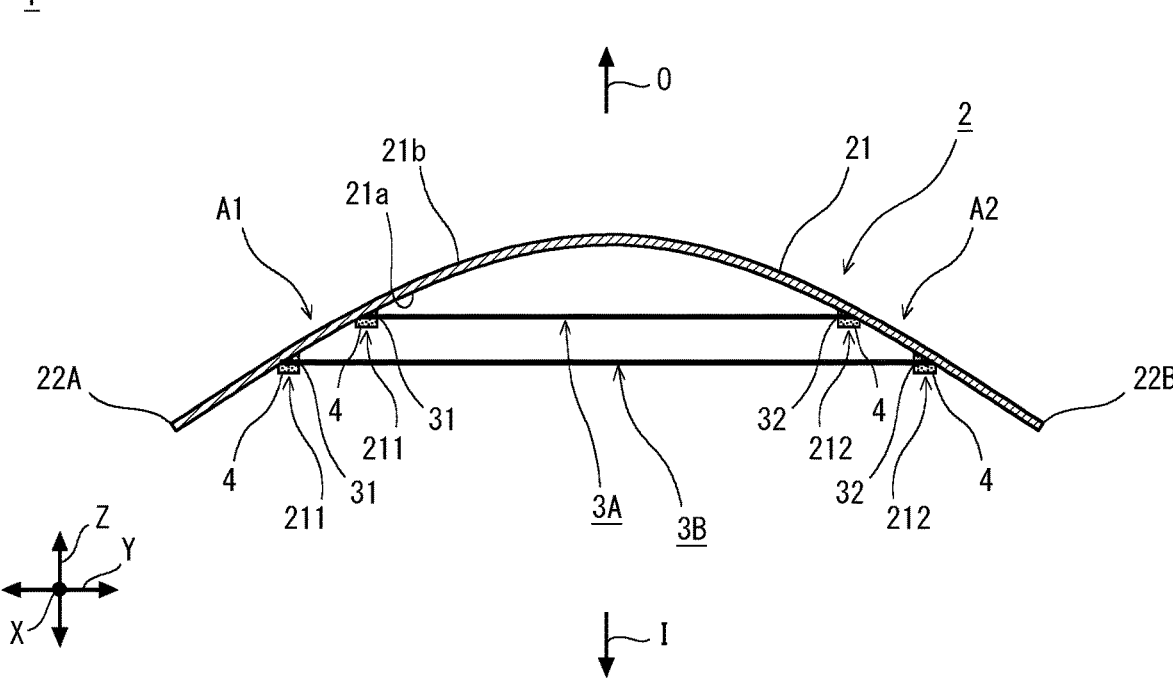
FIG. 10 is a sectional view of a stiffened panel structure according to a fourth embodiment.

FIG. 10 shows a stiffened panel structure 1, in which a panel-shaped component 2 is stiffened, according to a fourth embodiment. FIG. 10 is a sectional view of the stiffened panel structure 1 when the panel-shaped component 2 is cut in a plane perpendicular to X direction. The stiffened panel structure 1 of the fourth embodiment is a modification of the stiffened panel structure 1 of the first embodiment. The fourth embodiment will hereinafter be described mainly with respect to differences from the first embodiment.

In the stiffened panel structure 1 of the present embodiment, the wires 3 include a first wire 3A and a second wire 3B that are different in length. The first wire 3A is shorter than the second wire 3B. As in the first embodiment, the panel body 21 of the panel-shaped component 2 curves in such a manner as to be convex outward O. In a sectional view of the panel-shaped component 2, the first wire 3A is located in an outward (O) portion of the panel-shaped component 2, and the second wire 3B is located in an inward (I) portion of the panel-shaped component 2. Accordingly, the first wire 3A and the second wire 3B are arranged side by side in Z direction. From another view, the first wire 3A and the second wire 3B are located in the same position with respect to X direction.

The respective first end portions 31 of the first wire 3A and the second wire 3B are bonded to first points 211 in the first area A1 of the panel body 21. The respective second portions 32 of the first wire 3A and the second wire 3B are bonded to second points 212 in the second area A2 of the panel body 21.

The stiffened panel structure 1 of the present embodiment has the same advantages as the first embodiment. As compared with the first embodiment, the stiffened panel structure 1 of the present embodiment achieves higher flare rigidity.

Fifth Embodiment

Figure 11:
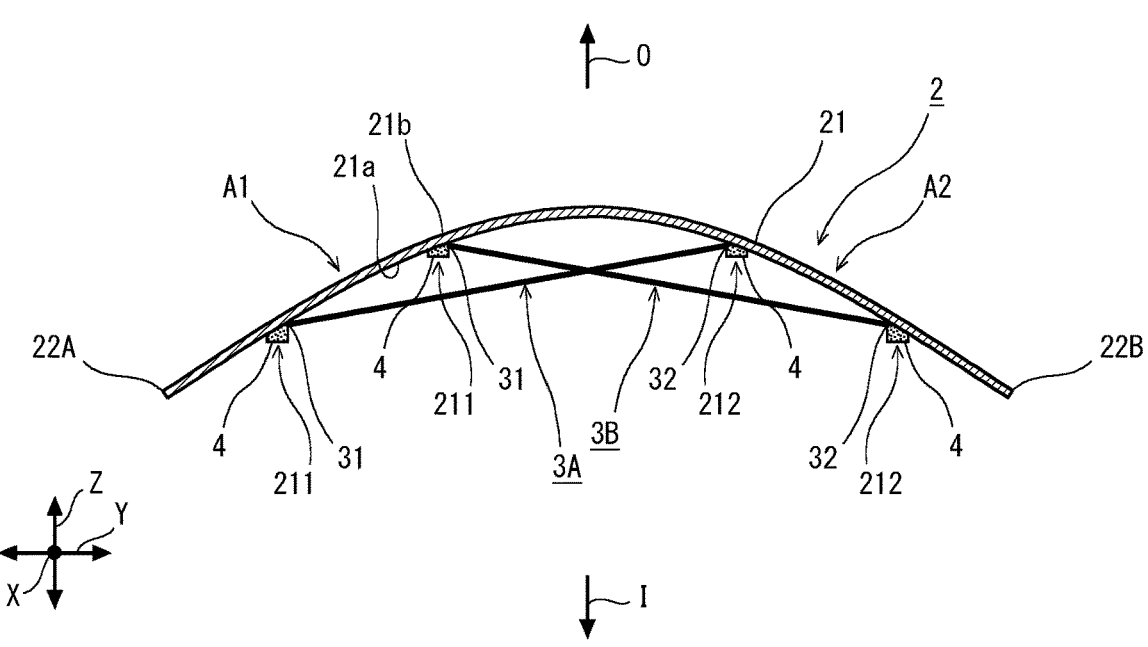
FIG. 11 is a sectional view of a stiffened panel structure according to a fifth embodiment.

FIG. 11 shows a stiffened panel structure 1, in which a panel-shaped component 2 is stiffened, according to a fifth embodiment. FIG. 11 is a sectional view of the stiffened panel structure 1 when the panel-shaped component 2 is cut in a plane perpendicular to X direction. The stiffened panel structure 1 of the fifth embodiment is a modification of the stiffened panel structure 1 of the first embodiment. The fifth embodiment will hereinafter be described mainly with respect to differences from the first embodiment.

In the stiffened panel structure 1 of the present embodiment, the wires 3 include a first wire 3A and a second wire 3B. Each of the wires 3A and 3B extends in Y direction. In a sectional view of the panel-shaped component 2, the first wire 3A is positioned near the first lateral edge 22A of the panel-shaped component 2, and the second wire 3B is positioned near the second lateral edge 22B of the panel-shaped component 2. The second wire 3B intersects the first wire 3A. However, the second wire 3B is located in a position slightly away from the first wire 3A with respect to X direction.

The first wire 3A and the second wire 3B are equal in length. However, the first wire 3A and the second wire 3B may be different in length.

The first end portion 31 of the first wire 3A is bonded to a first point 211 in the first area A1, in the part near the first lateral edge 22A, and the second end portion 32 of the first wire 3A is bonded to a second point 212 in the second area A2, in the part near the first lateral edge 22A. The first end portion 31 of the second wire 3B is bonded to a first point

211 in the first area A1, in the part near the second lateral edge 22B, and the second end portion 32 of the second wire 3B is bonded to a second point 212 in the second area A2, in the part near the second lateral edge 22B.

The stiffened panel structure 1 of the present embodiment has the same advantages as the first embodiment. As in the fourth embodiment, the stiffened panel structure 1 of the present embodiment achieves higher flare rigidity.

Sixth Embodiment

Figure 12:
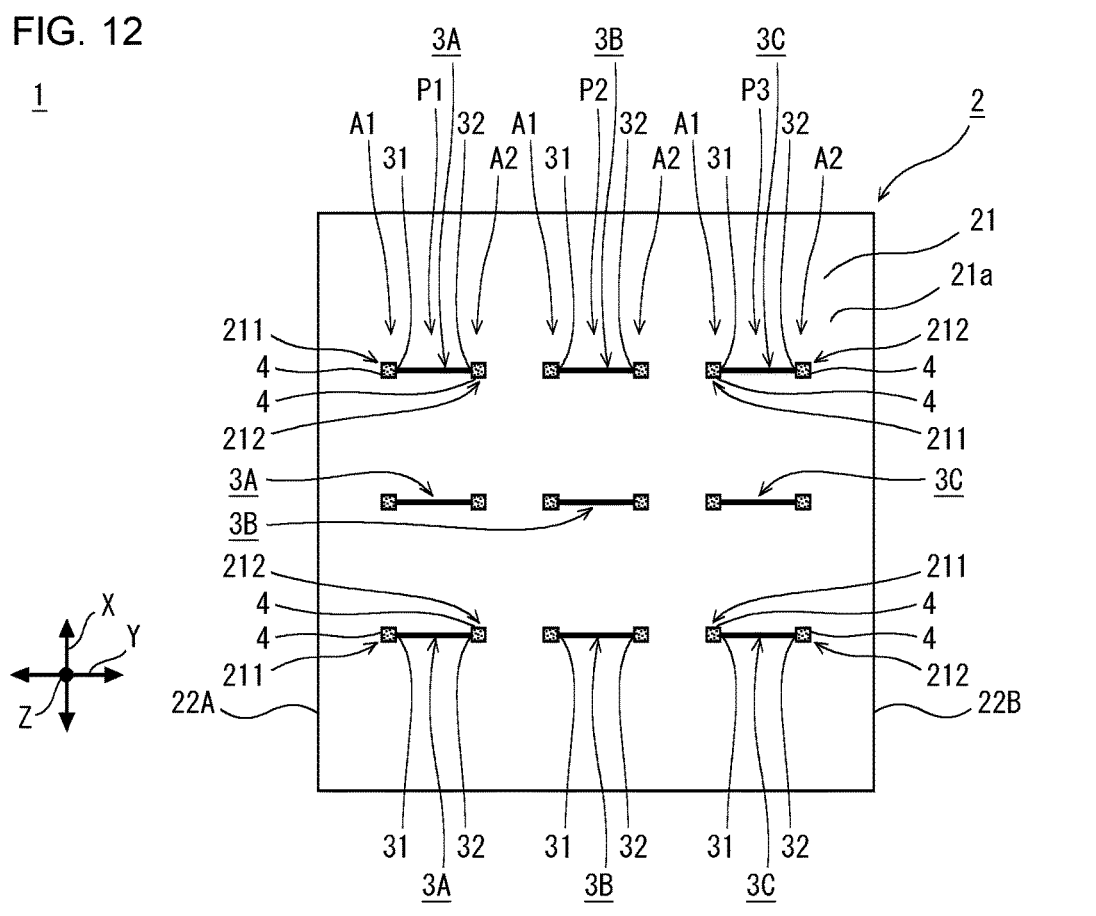
FIG. 12 is a plan view of a stiffened panel structure according to a sixth embodiment.
Figure 13:
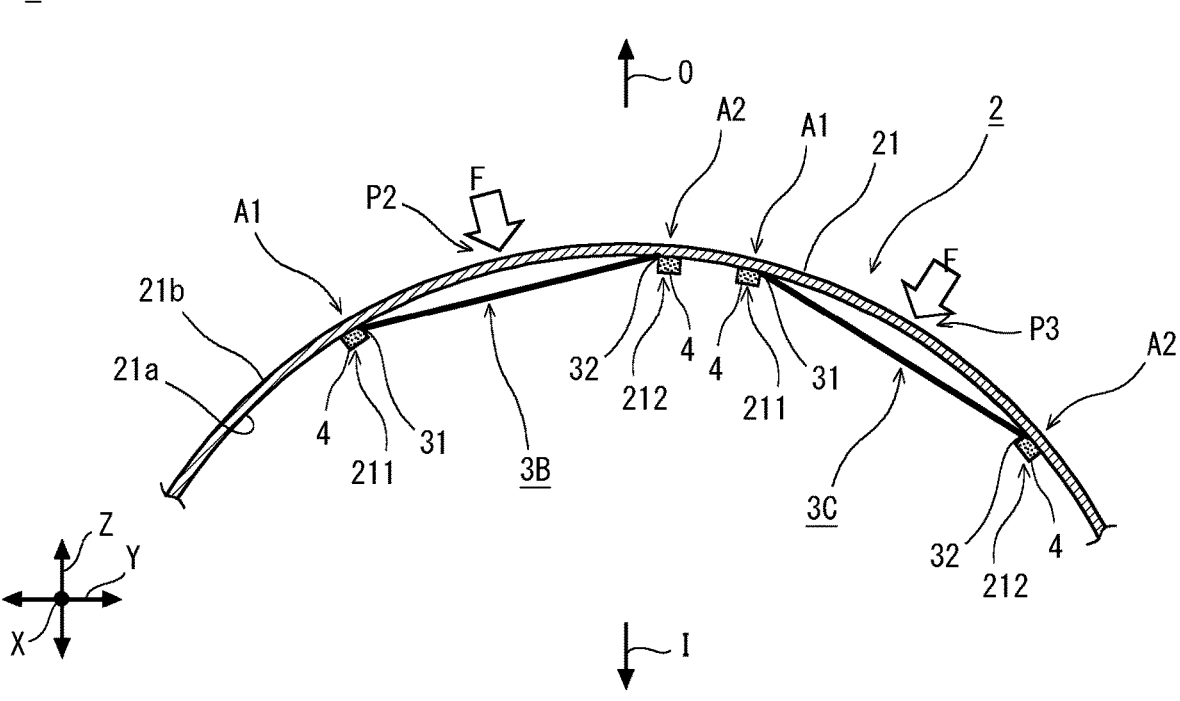
FIG. 13 is a sectional view of a part of the stiffened panel structure according to the sixth embodiment.

FIGS. 12 and 13 show a stiffened panel structure 1, in which a panel-shaped component 2 is stiffened, according to a sixth embodiment. FIG. 12 is a plan view of the stiffened panel structure 1 when the panel-shaped component 2 is viewed from inside I. FIG. 13 is a sectional view of a part of the stiffened panel structure 1 when the panel-shaped component 2 is cut in a plane perpendicular to X direction. The stiffened panel structure 1 of the sixth embodiment is a modification of the stiffened panel structure 1 of the first embodiment. The sixth embodiment will hereinafter be described mainly with respect to differences from the first embodiment.

Regarding the stiffened panel structure 1 of the present embodiment, the panel body 21 is expected to be subjected to loads F on three points that are arranged at intervals in Y direction. In other words, the panel body 21 has three expected load points, namely, a first expected load point P1, a second expected load point P2, and a third expected load point P3. The first expected load point P1, the second expected load point P2, and the third expected load point P3 are arranged on the panel body 21 in this order from the first lateral edge 22A toward the second lateral edge 22B.

Additionally, for each of the expected load points P1, P2 and P3, there are outward deformation areas. Specifically, the first area A1 and the second area A2 exist on both sides, with respect to Y direction, of the first expected load point P1. The first area A1 and the second area A2 exist on both sides, with respect to Y direction, of the second expected load point P2. The first area A1 and the second area A2 exist on both sides, with respect to Y direction, of the third expected load point P3.

In the stiffened panel structure 1 of the present embodiment, the wires 3 include first wires 3A, second wires 3B, and third wires 3C. Each of the wires 3A, 3B and 3C extends in Y direction. The wires 3A, 3B and 3C are provided for the expected load points P1, P2 and P3, respectively. The wires 3A, 3B and 3C are equal in length. However, the wires 3A, 3B and 3C may be different in length.

The respective first end portions 31 of the first wires 3A are bonded to first points 211 in the first area A1 associated with the first expected load point P1. The respective second end portions 32 of the first wires 3A are bonded to second points 212 in the second area A2 associated with the first expected load point P1.

The respective first end portions 31 of the second wires 3B are bonded to first points 211 in the first area A1 associated with the second expected load point P2. The respective second end portions 32 of the second wires 3B are bonded to second points 212 in the second area A2 associated with the second expected load point P2.

The respective first end portions 31 of the third wires 3C are bonded to first points 211 in the first area A1 associated with the third expected load point P3. The respective second end portions 32 of the third wires 3C are bonded to second points 212 in the second area A2 associated with the third expected load point P3.

The stiffened panel structure 1 of the present embodiment has the same advantages as the first embodiment. According to the present embodiment, even when the panel-shaped component 2 of the stiffened panel structure 1 has a plurality of expected load points, the flare rigidity around each of the expected load points can be enhanced.

Seventh Embodiment

Figure 14:
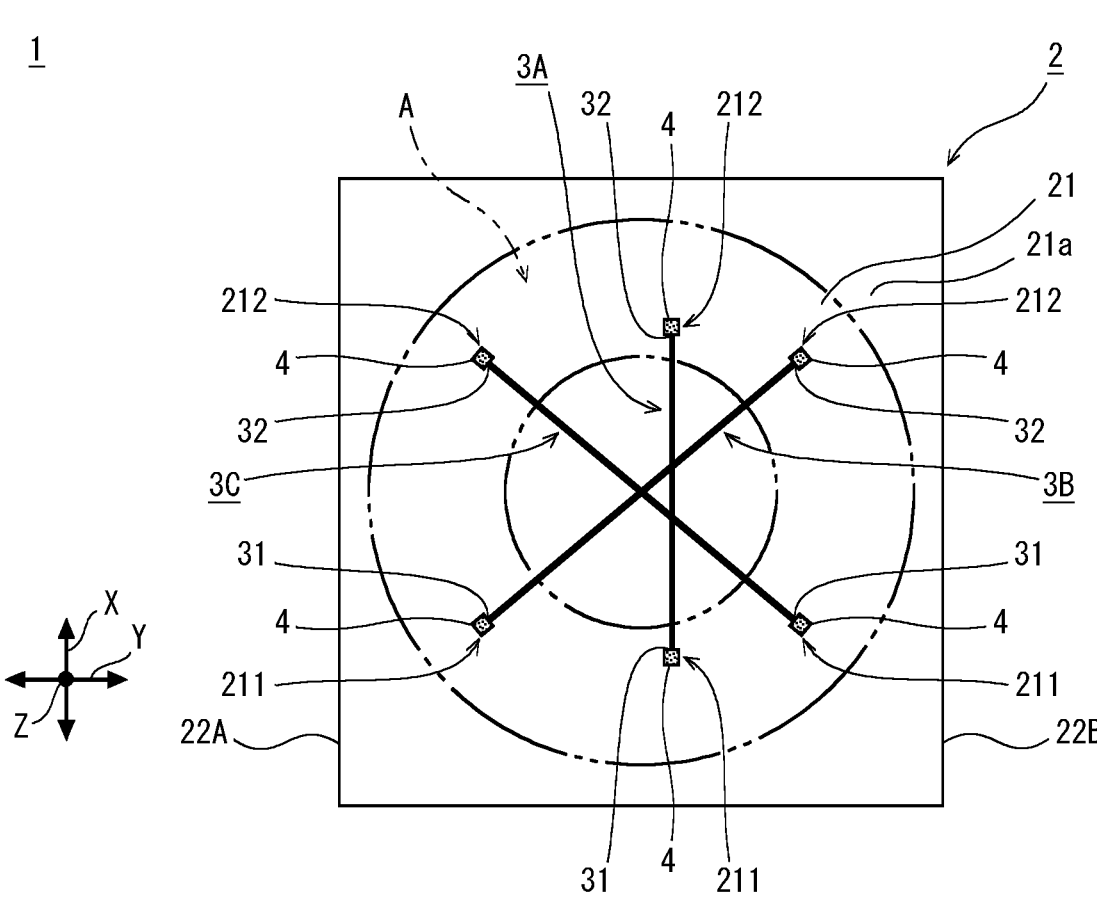
FIG. 14 is a plan view of a stiffened panel structure according to a seventh embodiment.

FIG. 14 shows a stiffened panel structure 1, in which a panel-shaped component 2 is stiffened, according to a seventh embodiment. FIG. 14 is a plan view of the stiffened panel structure 1 when the panel-shaped component 2 is viewed from inside I. The stiffened panel structure 1 of the seventh embodiment is a modification of the stiffened panel structure 1 of the first embodiment. The seventh embodiment will hereinafter be described mainly with respect to differences from the first embodiment.

In the stiffened panel structure 1 of the present embodiment, the panel-shaped component 2 is rectangular in planar view from Z direction. The panel-shaped component 2 includes a panel body 21. The panel body 21 spreads from the center of the panel-shaped component 2 to the vicinity of the four sides. The central portion, with respect to X direction and Y direction, of the panel body 21 has a spherical surface projecting outward O. Thus, the panel body 21 curves in such a manner as to be convex outward O. In the panel-shaped component 2, the center of the panel body 21 is the most outward (O) projecting portion. From another view, the panel body 21 curves multi-directionally. The panel body 21 in the first embodiment curves almost in one direction (Y direction).

Regarding the stiffened panel structure 1 of the present embodiment, the panel body 21 is expected to be subjected to a load F on the central portion. In other words, the panel body 21 has an expected load point in the central portion. In association with the expected load point, an outward deformation area A exists in the panel body 21. Since the panel body 21 is spherical, the outward deformation area A has an annular shape having a center on the expected load point. Accordingly, for example, in a sectional view obtained by cutting the panel body 21 in a plane perpendicular to Y direction, it appears that the outward deformation area A exists on both sides of the central portion (expected load point) of the panel body 21. In this case, the outward deformation area A on one side can be deemed as the first area, and the outward deformation area A on the other side can be deemed as the second area.

In the stiffened panel structure 1 of the present embodiment, the wires include a first wire 3A, a second wire 3B and a third wire 3C. The first wire 3A extends in X direction. The second wire 3B extends linearly in such a manner as to obliquely intersect the first wire 3A. The third wire 3C extends in a direction almost perpendicular to the second wire 3B.

The first wire 3A intersects the second wire 3B and the third wire 3C at points off from the intersection point between the second wire 3B and the third wire 3C. Accordingly, the three wires 3A, 3B and 3C do not intersect at one point. The wires 3A, 3B and 3C are positioned in such a manner as to pass through the central portion (expected load point) of the panel body 21 or its vicinity.

The first end portion 31 of the first wire 3A is bonded to a first point 211 in the deemed first area of the outward deformation area A. The second end portion 32 of the first wire 3A is bonded to a second point 212 in the deemed second area of the outward deformation area A. The same applies to the second wire 3B and the third wire 3C.

The stiffened panel structure 1 of the present embodiment has the same advantages as the first embodiment. According to the present embodiment, even when the panel body 21 of the stiffened panel structure 1 is curved multi-directionally, the flare rigidity can be enhanced.

Eighth Embodiment

Figure 15:
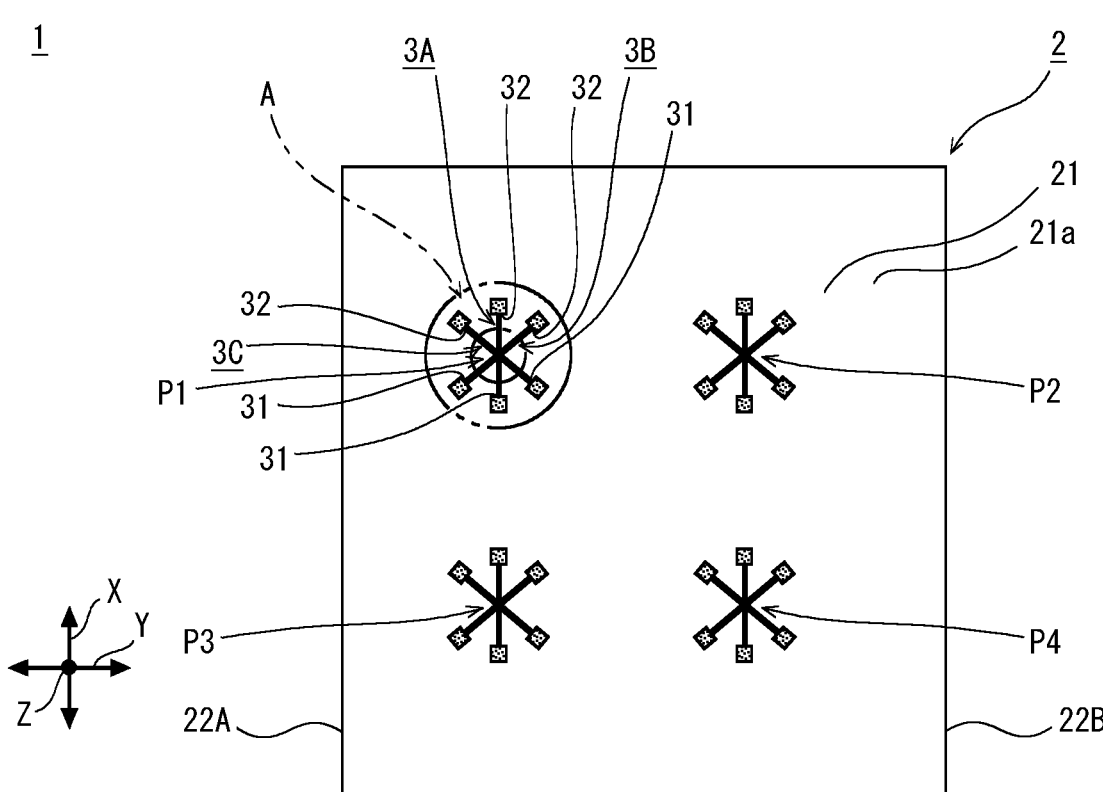
FIG. 15 is a plan view of a stiffened panel structure according to an eighth embodiment.

FIG. 15 shows a stiffened panel structure 1, in which a panel-shaped component 2 is stiffened, according to an eighth embodiment. FIG. 15 is a plan view of the stiffened panel structure 1 when the panel-shaped component 2 is viewed from inside I. The stiffened panel structure 1 of the eighth embodiment is an outcome of application of the technical concept of the sixth embodiment to the stiffened panel structure 1 of the seventh embodiment. The eighth embodiment will hereinafter be described mainly with respect to differences from the seventh embodiment.

Regarding the stiffened panel structure 1 of the present embodiment, the panel body 21 having a spherical surface is expected to be subjected to loads F on four points that are arranged at intervals in X direction and in Y direction. In other words, the panel body 21 has four expected load points, namely, a first expected load point P1, a second expected load point P2, a third expected load point P3, and a fourth expected load point P4. The first expected load point P1 and the second expected load point P2 are arranged on the panel body 21 in this order from the first lateral edge 22A toward the second lateral edge 22B. The third expected load point P3 and the fourth expected load point P4 are arranged on the panel body 21 in this order from the first lateral edge 22A toward the second lateral edge 22B. The first expected load point P1 and the third expected load point P3 are arranged in X direction. The second expected load point P2 and the fourth expected load point P4 are arranged in X direction.

Around each of the expected load points P1, P2, P3 and P4, an outward deformation area A exists. As in the seventh embodiment, the outward deformation area A around the expected load point P1 has an annular shape having a center on the first expected load point P1. Accordingly, for example, in a sectional view obtained by cutting the panel body 21 in a plane perpendicular to Y direction, it appears that the outward deformation area A exists on both sides of the first expected load point P1. In this case, the outward deformation area A on one side can be deemed as the first area, and the outward deformation area A on the other side can be deemed as the second area. The same applies to the second expected load point P2, the third expected load point P3 and the fourth expected load point P4.

In the stiffened panel structure 1 of the present embodiment, the wires for the first expected load point P1 include a first wire 3A, a second wire 3B and a third wire 3C. The first wire 3A extends in X direction. The second wire 3B extends linearly in such a manner as to obliquely intersect the first wire 3A. The third wire 3C extends in a direction almost perpendicular to the second wire 3B. The three wires 3A, 3B and 3C intersect at one point. The wires 3A, 3B and 3C are positioned in such a manner as to pass through the first expected load point P1 of the panel body 21.

Regarding the first expected load point P1, the first end portion 31 of the first wire 3A is bonded to a first point in the deemed first area of the outward deformation area A. The second end portion 32 of the first wire 3A is bonded to a second point in the deemed second area of the outward deformation area A. The same applies to the second wire 3B and the third wire 3C. Further, the same applies to the wires for the second expected load point P2, the wires for the third expected load point P3, and the wires for the fourth expected load point P4.

The stiffened panel structure 1 of the present embodiment has the same advantages as the sixth and seventh embodiments. According to the present embodiment, even when the panel body 21 of the stiffened panel structure 1 is curved multi-directionally and has a plurality of expected load points, the flare rigidity around each of the expected load points can be enhanced.

Ninth Embodiment

Figure 16:
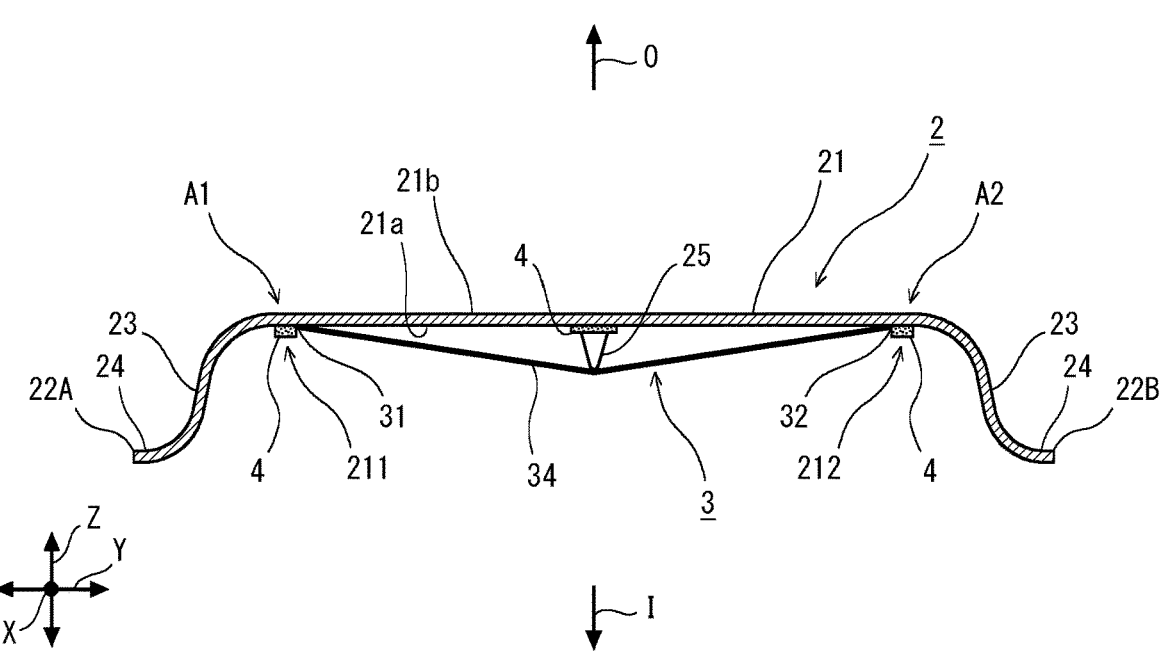
FIG. 16 is a sectional view of a stiffened panel structure according to a ninth embodiment.
Figure 17:
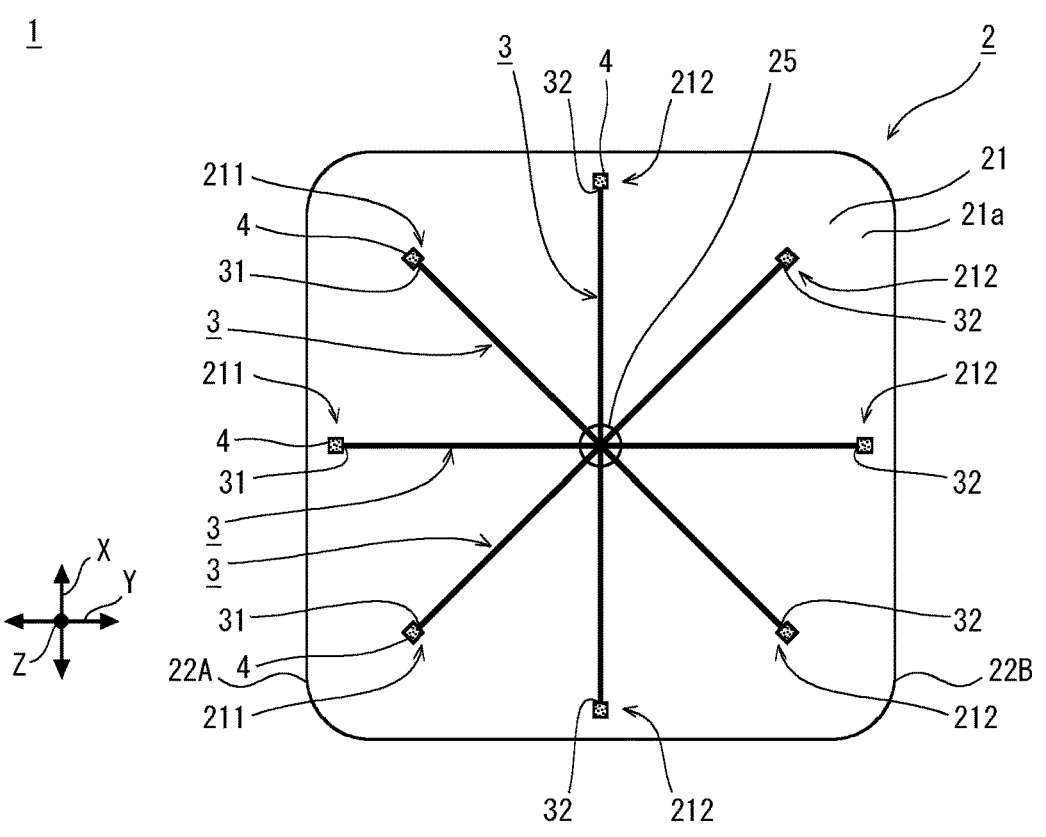
FIG. 17 is a plan view of the stiffened panel structure according to the ninth embodiment.

FIGS. 16 and 17 show a stiffened panel structure 1, in which a panel-shaped component 2 is stiffened, according to a ninth embodiment. FIG. 16 is a sectional view of the stiffened panel structure 1 when the panel-shaped component 2 is cut in a plane perpendicular to X direction. FIG. 17 is a plan view of the stiffened panel structure 1 when the panel-shaped component 2 shown in FIG. 1 is viewed from inside I. The stiffened panel structure 1 of the ninth embodiment is a modification of the stiffened panel structure 1 of the first embodiment. The ninth embodiment will hereinafter be described mainly with respect to differences from the first embodiment.

In the stiffened panel structure 1 of the present embodiment, the panel-shaped component 2 is rectangular in planar view from Z direction. The panel-shaped component 2 includes a panel body 21, an extension/projection part 23 and a flange 24. The panel body 21 is flat. The panel body 21 is rectangular in planar view from Z direction. The extension/projection part 23 extends and projects inward I from the sides of the panel body 21 defining the outline of the panel body 21. The flange 24 extends laterally from the extension/projection part 23. The extension/projection part 23 and the flange 24 correspond to four lateral edges (first lateral edge 22A, second lateral edge 22B) of the panel-shaped component 2.

A supporting member 25 is located on the inner surface 21a of the panel body 21. In the present embodiment, the supporting member 25 projects inward I from the center of the panel body 21. The supporting member 25 is shaped like a frustum. Specifically, the supporting member 25 is shaped like a frustum of a cone. However, the shape of the supporting member 25 is not limited to a frustum of a cone but may be a frustum of a pyramid. Alternatively, the shape of the supporting member 25 is not limited to a frustum but may be a cylinder or a prism.

The supporting member 25 is made of plastic. The supporting member 25 is bonded to the panel body 21 by an adhesive 4. However, the supporting member 25 may be made of metal, and for example, may be made of steel. Considering avoiding an increase in weight, it is preferred that the supporting member 25 is made of plastic.

In the present embodiment, there is an expected load point on and around the center of the panel body 21. In other words, there is an expected load point on and around the supporting member 25. Even though the panel body 21 is flat, there is an outer deformation area. As in the case in which the panel body 21 curves in such a manner as to be convex outward O, the outward deformation area in the present embodiment has an annular shape having a center on the center of the panel body 21 (supporting member 25). Therefore, for example, in a sectional view obtained by cutting the panel body 21 in a plane perpendicular to X direction, it appears that the outward deformation area exists on both sides of the supporting member 25 (expected load point) of the panel body 21. In this case, the outward deformation area on one side can be deemed as the first area A1, and the outward deformation area on the other side can be deemed as the second area A2.

A first point 211 is settled in the deemed first area A1, which is the outward deformation area on one side. A second point 212 is settled in the deemed second area A2, which is the outward deformation area on the other side. Accordingly, the second point 212 is on the opposite side of the first point 211 across the supporting member 25. In other words, the supporting member 25 is between the first point 211 and the second point 212.

Each wire 3 is positioned in such a manner as to extend linearly toward both lateral edges from the supporting member 25. For example, a wire 3 extends in Y direction from the first lateral edge 22A toward the second lateral edge 22B. As shown in FIG. 17, the stiffened panel structure 1 of the present embodiment has three wires 3. The three wires 3 are positioned in such a manner as to intersect at the position of the supporting member 25. From another view, the three wires 3 are positioned in such a manner as to extend radially from the supporting member 25. However, the number of wires 3 is not limited to three. The number of wires 3 may be one, two, three or more.

As shown in FIGS. 16 and 17, the first end portion 31 of each of the wires 3 is bonded to a first point 211 on the inner surface 21a of the panel body 21 by the adhesive 4. The second end portion 32 of each of the wires 3 is bonded to a second point 212 on the inner surface 21a of the panel body 21 by the adhesive 4. Since the supporting member 25 exists between the first point 211 and the second point 212, the wire 3 is strained between the first point 211 and the second point 212 via the supporting member 25. Accordingly, the wire 3 is supported by the supporting member 25. In this case, the wire body 34 is in contact with the supporting member 25 and bends at the supporting member 25. Therefore, the wire 3 extends linearly from the first point 211 to the supporting member 25 and extends linearly from the second point 212 to the supporting member 25. Further, the part of the wire body 34 between the first point 211 and the supporting member 25 and the part of the wire body 34 between the second point 212 and the supporting member 25 are out of contact with the inner surface of the panel body 21.

Each of the wires 3 is not bonded to the supporting member 25. However, each of the wires 3 may be bonded to the supporting member 25. In that case, the way of bonding is adhesive bonding, for example.

When a load F is applied to the panel body 21 of the stiffened panel structure 1 of the present embodiment, as in the case of the first embodiment, each of the wires 3 is subjected to tensile force T, and the panel body 21 receives reaction force to the tensile force T from the wire 3 on the first point 211 and the second point 212. This suppresses deformation of the panel body 21 at the first point 211 and the second point 212, which makes it possible to suppress deformation of the first area A1 and the second area A2 of the panel body 21. Thus, deformation of the outward deformation area can be suppressed. Then, when a load F is applied to the panel body 21, deformation of the expected load point can be suppressed.

As described above, the stiffened panel structure 1 of the present embodiment has the same advantages as the first embodiment even when the panel body 21 is flat.

In the present embodiment, the supporting member 25 supporting the wires 3 is provided on a flat panel body 21. However, the supporting member 25 supporting the wires 3 may be provided on a panel body 21 that curves in such a manner as to be convex outward O. Thus, the configuration of supporting the wires 3 on the supporting member 25 is applicable to the stiffened panel structures 1 of the first to eighth embodiments.

Tenth Embodiment

Figure 18:
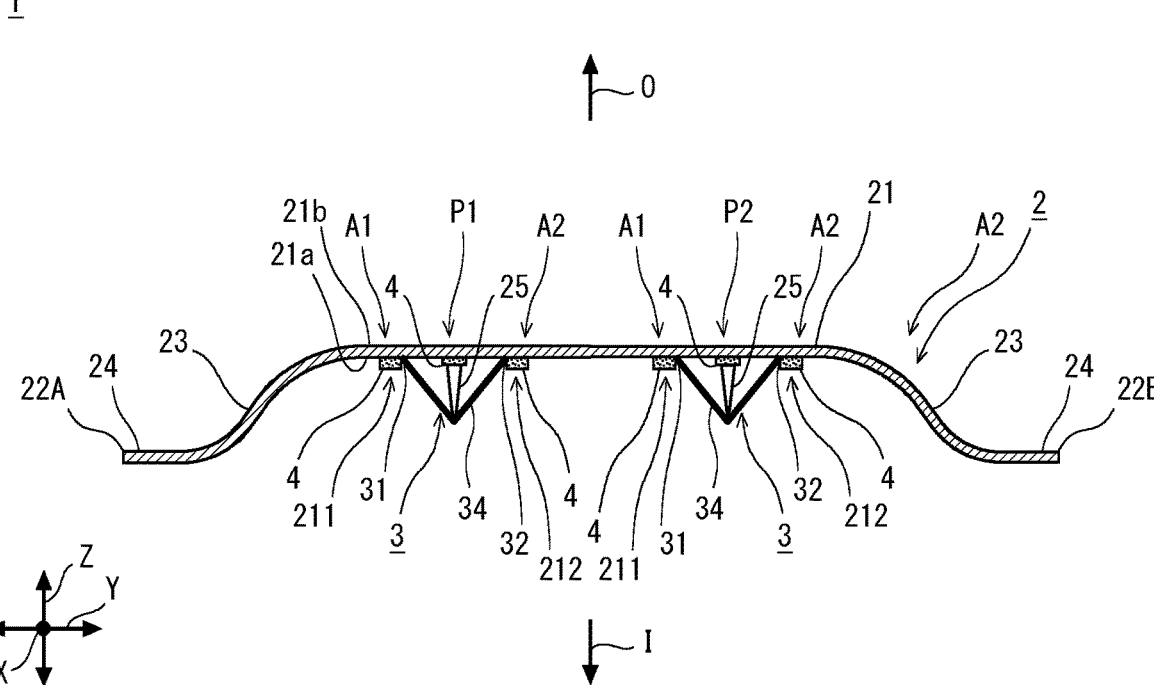
FIG. 18 is a sectional view of a stiffened panel structure according to a tenth embodiment.

FIG. 18 shows a stiffened panel structure 1, in which a panel-shaped component 2 is stiffened, according to a tenth embodiment. FIG. 18 is a sectional view of the stiffened panel structure 1 when the panel-shaped component 2 is cut in a plane perpendicular to X direction. The stiffened panel structure 1 of the tenth embodiment is an outcome of application of the technical concept of the sixth embodiment to the stiffened panel structure 1 of the ninth embodiment. The tenth embodiment will hereinafter be described mainly with respect to differences from the ninth embodiment.

The stiffened panel structure 1 of the present embodiment includes a flat panel body 21, and the flat panel body 21 is expected to be subjected to loads F on two points spaced from each other in Y direction. Thus, there are two expected load points, namely, a first expected load point P1 and a second expected load point P2, on the panel body 21. The first expected load point P1 and the second expected load point P2 are arranged on the panel body 21 in this order in a direction from the first lateral edge 22A toward the second lateral edge 22B. At each of the first expected point P1 and the second expected point P2, a supporting member 25 is provided.

In the stiffened panel structure 1 of the present embodiment, as in the ninth embodiment, there is an outward deformation area around each of the expected load points P1 and P2 (supporting members 25). Then, wires 3 are arranged on the outward deformation area around each of the expected load points P1 and P2 in the same fashion as in the ninth embodiment.

The stiffened panel structure 1 of the present embodiment has the same advantages as the sixth and ninth embodiments. Specifically, in the stiffened panel structure 1 of the present embodiment, even though the panel body 21 is flat and has a plurality of expected load points, the flare rigidity around each of the expected load points is improved.

Eleventh Embodiment

Figure 19:
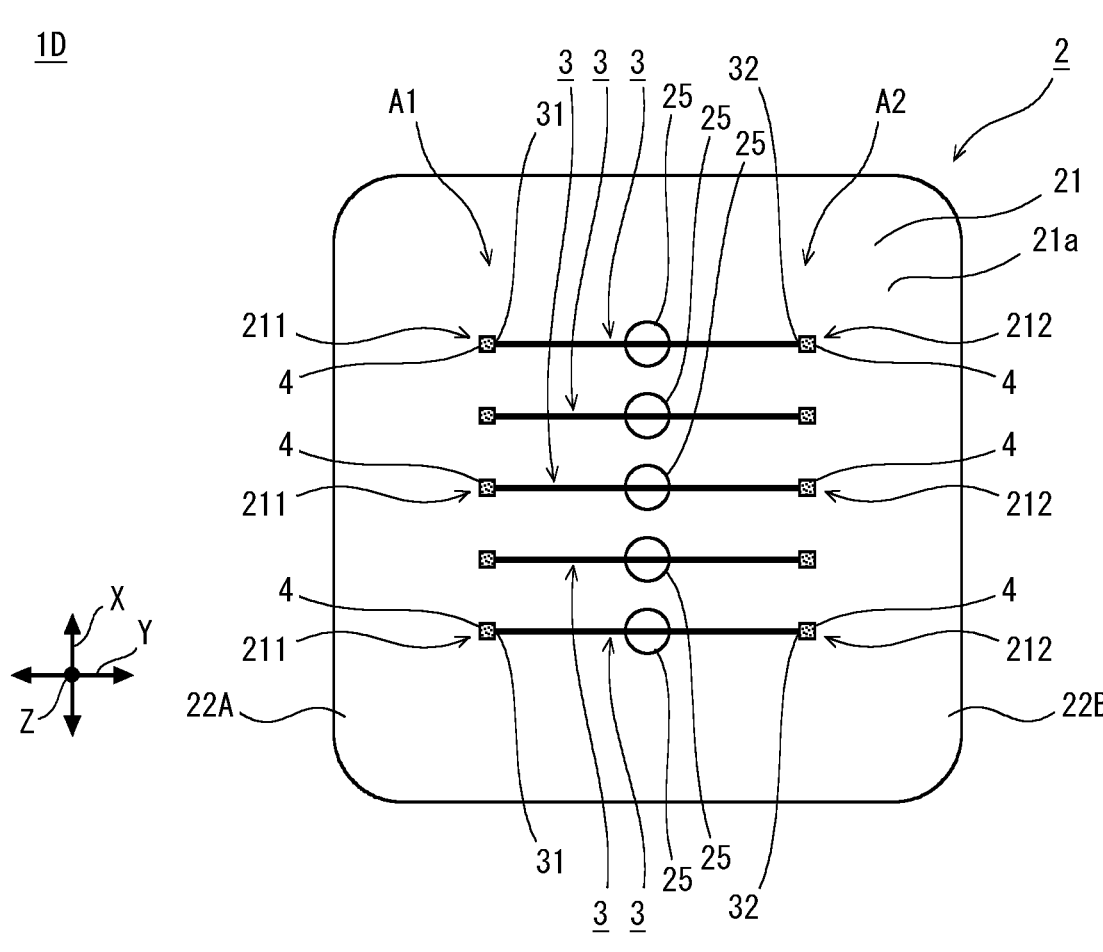
FIG. 19 is a plan view of a stiffened panel structure according to an eleventh embodiment.

FIG. 19 shows a stiffened panel structure 1D, in which a panel-shaped component 2 is stiffened, according to an eleventh embodiment. FIG. 19 is a plan view of the stiffened panel structure 1D when the panel-shaped component 2 is viewed from inside I. The stiffened panel structure 1D of the eleventh embodiment is a modification of the stiffened panel structure 1 of the ninth embodiment. The eleventh embodiment will hereinafter be described mainly with respect to differences from the ninth embodiment.

The stiffened panel structure 1D of the present embodiment includes five supporting members 25. These five supporting members 25 are arranged in X direction in an equidistant manner. For each of the supporting members 25, one wire 3 is provided. The wire 3 extends in a direction from the first lateral edge 22A toward the second lateral edge 22B. In this case, the five wires 3 are arranged side by side in X direction in an equidistant manner.

The stiffened panel structure 1D of the present embodiment has the same advantages as the ninth embodiment.

(Third Load Test)

Figure 20:
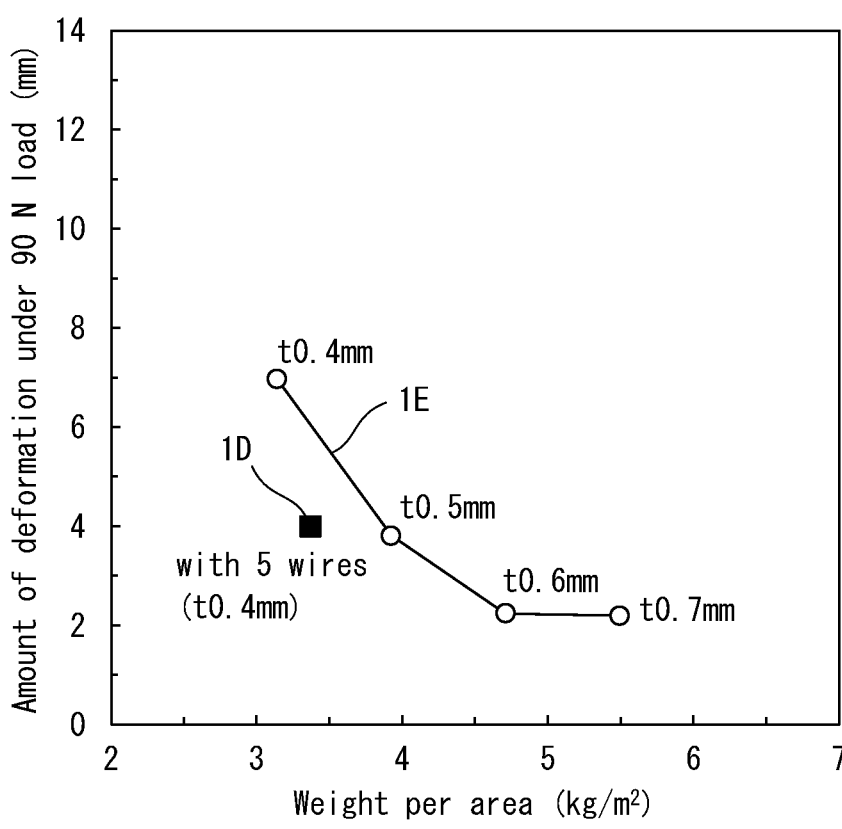
FIG. 20 is a chart showing results of a third load test on the stiffened structure of the eleventh embodiment.

FIG. 20 is a chart showing results of a third load test on the stiffened panel structure of the eleventh embodiment. FIG. 20 shows the relationship between the weight per unit area of the panel-shaped component and the amount of deformation of the panel-shaped component. As in the first load test, the amount of deformation means the amount of displacement of the point of the panel body onto which the load was applied (the amount of displacement of the expected load point).

For the third load test, the stiffened panel structure 1D, in which a panel-shaped component 2 is stiffened, of the eleventh embodiment was prepared. For comparison, further, non-stiffened panel structures 1E, that is, panel-shaped components 2 with no wires and no supporting members attached thereto were prepared. A load of 90 N was applied to each of the panel-shaped components 2, and the amount of deformation was measured.

The principal conditions of the test that was conducted on the stiffened panel structure 1D and the non-stiffened panel structure 1E were as follows.

The material of the panel-shaped components 2 was a cold-rolled steel sheet for automotive use JSC270D according to Japan Iron and Steel Federation Standards (JFS). Each of the panel-shaped components 2 was entirely flat. Each of the panel-shaped components 2 was rectangular in planar view from Z direction, and the sides defining the outline of the panel-shaped component 2 was each 400 mm in length. Each of the supporting members 25 was 20 mm in height.

The material of the wires 3 was rolled steel for general structure SS400 (JIS G 3101). Each of the wires 3 was a single wire and had a diameter of 2.0 mm. Each of the wires 3 had a length of 275 mm.

A low-odorousness acrylic adhesive Y-600 made by Cemedine Co., Ltd. was used as the adhesive 4 for bonding between the wires 3 and the panel-shaped components 2.

The sheet thickness t of the panel-shaped component 2 of the stiffened panel structure 1D was 0.4 mm. As the non-stiffened panel structures 1E, four panel-shaped components 2 that were different in sheet thickness t were subjected to the test. The sheet thicknesses t of these four panel-shaped components 2 were 0.4 mm, 0.5 mm, 0.6 mm and 0.7 mm, respectively.

As shown in FIG. 20, when the panel-shaped components 2 with the same sheet thickness t of 4.0 mm are compared with each other, the amount of deformation of the panel-shaped component 2 of the stiffened panel structure 1D was much smaller than the amount of deformation of the panel-shaped component 2 of the non-stiffened panel structure 1E. The weight per unit area of the panel-shaped component 2 of the stiffened panel structure 1D was much smaller than the weight per unit area of any of the panel-shaped components 2 of the non-stiffened panel structures 1E with a sheet thickness of 0.5 mm or more.

Twelfth Embodiment

Figure 21:
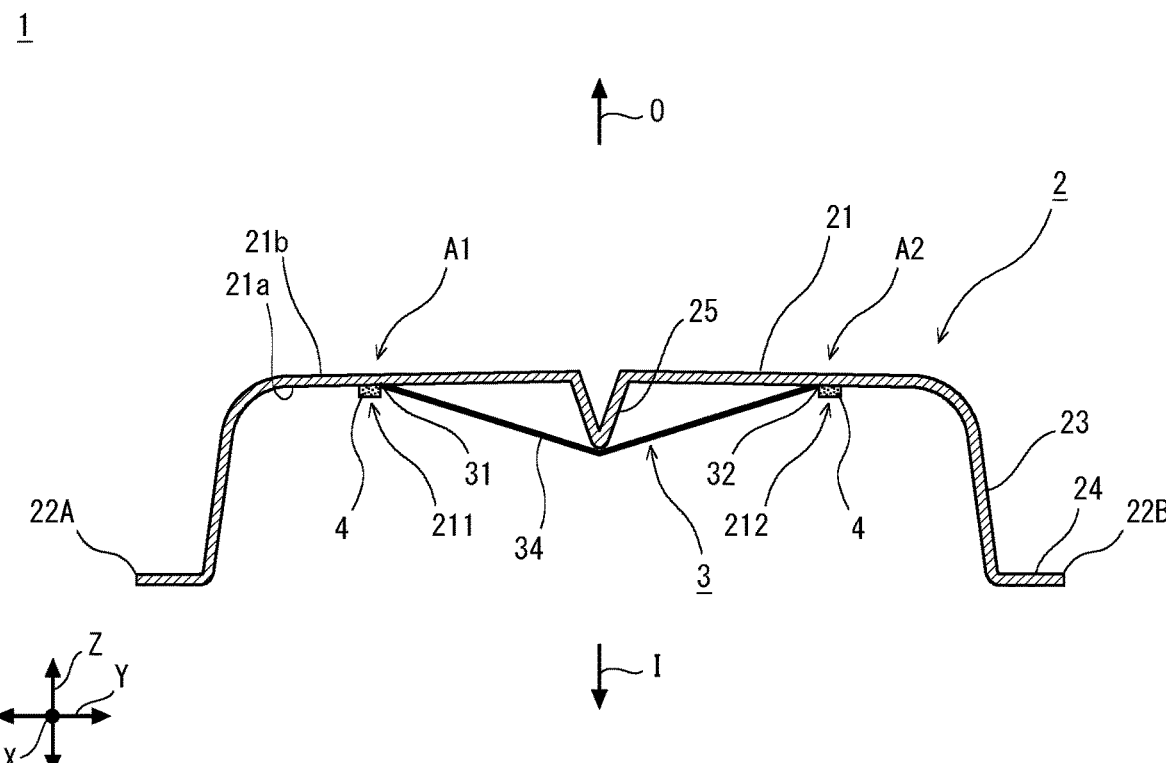
FIG. 21 is a sectional view of a stiffened panel structure according to a twelfth embodiment.

FIG. 21 shows a stiffened panel structure 1, in which a panel-shaped component 2 is stiffened, according to a twelfth embodiment. FIG. 21 is a sectional view of the stiffened panel structure 1 when the panel-shaped component 2 is cut in a plane perpendicular to X direction. The stiffened panel structure 1 of the twelfth embodiment is a modification of the stiffened panel structure 1 of the eleventh embodiment. The twelfth embodiment will hereinafter be described mainly with respect to differences from the eleventh embodiment.

Usually, a character line is formed on the panel body of a door outer panel in such a manner as to extend in the vehicle length direction. The character line projects toward the inside of the door outer panel. The door outer panel with the character line is formed as a single piece by pressing.

In the stiffened panel structure 1 of the present embodiment, as shown in FIG. 21, the panel-shaped component 2 is a door outer panel, and the supporting member 25 attached to this panel-shaped component 2 is a character line. In this case, the supporting member 25 is formed integrally with the panel-shaped component 2. In the example shown in FIG. 21, X direction, Y direction and Z direction are the vehicle length direction, the vehicle height direction, and the vehicle width direction, respectively, of the automobile.

The supporting member 25 is positioned, for example, in the central portion of the panel-shaped component 2 with respect to Y direction (vehicle height direction). The supporting member 25 projects toward the inside I of the panel-shaped component 2. The supporting member 25 extends in X direction (vehicle length direction). Each of the wires 3 extends in Y direction (vehicle height direction) from the first lateral edge 22A toward the second lateral edge 22B.

The stiffened panel structure 1 of the present embodiment has the same advantages as the ninth embodiment. In the stiffened panel structure 1 of the present embodiment, since the supporting member 25 is formed integrally with the panel-shaped component 2, the manufacturing cost can be reduced.

In the present embodiment, the panel-shaped component 2 is a door outer panel, and the supporting member 25 is a character line formed on the panel-shaped component 2. However, the supporting member 25 is only required to be formed integrally with the panel-shaped component 2, and the panel-shaped component 2 is not limited to a door outer panel. For example, the panel-shaped component 2 may be a hood or a fender. In such a case, the supporting member 25 is a character line formed on the hood or fender.

Thirteenth Embodiment

Figure 22:
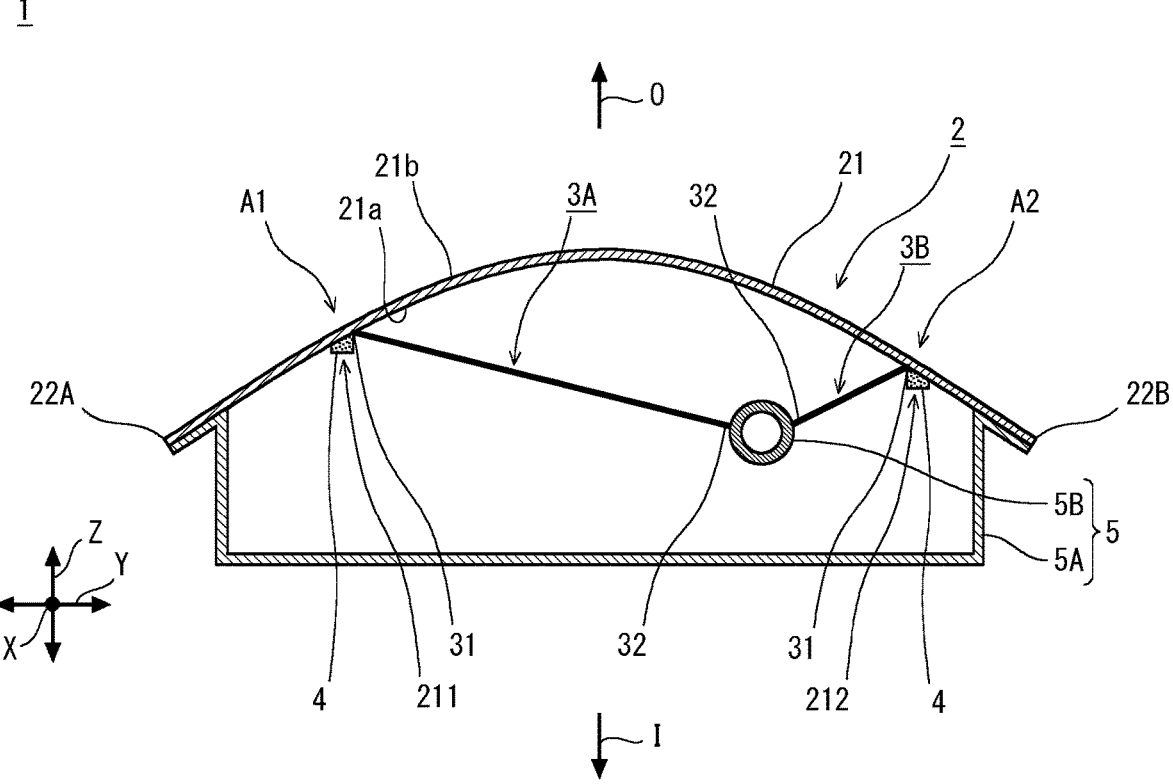
FIG. 22 is a sectional view of a stiffened panel structure according to a thirteenth embodiment.

FIG. 22 shows a stiffened panel structure 1, in which a panel-shaped component 2 is stiffened, according to a thirteenth embodiment. FIG. 22 is a sectional view of the stiffened panel structure 1 when the panel-shaped component 2 is cut in a plane perpendicular to X direction. The stiffened panel structure 1 of the thirteenth embodiment is a modification of the stiffened panel structures 1 of the above-described embodiments. The thirteenth embodiment will hereinafter be described mainly with respect to differences from the above-described embodiments.

The stiffened panel structure 1 of the present embodiment includes a panel-shaped component 2, auxiliary components 5, and wires 3. The panel-shaped component 2 includes a panel body 21, and the panel body 21 curves in such a manner as to be convex outward O. On the inside I of the panel-shaped component 2, a first auxiliary component 5A and a second auxiliary component 5B are arranged as the auxiliary components 5. The first auxiliary component 5A and the second auxiliary component 5B are integrated with the panel-shaped component 2.

For example, when the panel-shaped component 2 is a door outer panel, the first auxiliary component 5A is a door inner panel. The lateral edges of the first auxiliary component 5A (door inner panel) are bonded to the lateral edges of the panel-shaped component 2 (door outer panel) by welding or mechanical fastening. Thereby, the first auxiliary component 5A is integrated with the panel-shaped component 2. In this case, the second auxiliary component 5B is a long door impact beam. Both ends of the second auxiliary component 5B are fixed to the junctions between the first auxiliary component 5A and the panel-shaped component 2. Thereby, the second auxiliary component 5B is integrated with the panel-shaped component 2.

The wires 3 of the stiffened panel structure 1 of the present embodiment include a first wire 3A and a second wire 3B. In a sectional view of the panel-shaped component 2, the first wire 3A is positioned in an area near the first lateral edge 22A of the panel-shaped component 2, and the second wire 3B is positioned in an area near the second lateral edge 22B of the panel-shaped component 2. The first wire 3A and the second wire 3B are different in length. However, the first wire 3A and the second wire 3B may be equal in length.

The first end portion 31 of the first wire 3A is bonded to a first point 211 of the panel body 21 (panel body of the door outer panel). The second end portion 32 of the first wire 3A is bonded to the second auxiliary component 5B (door impact beam). Then, the first wire 3A is strained between the first point 211 and the second auxiliary component 5B.

The first end portion 31 of the second wire 3B is bonded to a second point 212 of the panel body 21 (panel body of the door outer panel). The second end portion 32 of the second wire 3B is bonded to the second auxiliary component 5B (door impact beam). Then, the second wire 3B is strained between the second point 212 and the second auxiliary component 5B.

The way of bonding each of the wires 3A and 3B to the second auxiliary component 5B is adhesive bonding. This is because adhesive bonding is simple and easy. However, welding or mechanical fastening may be used as the way of bonding.

In this case, the first wire 3A extends linearly from the first point 211 to the second auxiliary component 5B. The first wire 3A strained between the first point 211 and the second auxiliary component 5B is out of contact with the inner surface 21a of the panel body 21. Additionally, the second wire 3B extends linearly from the second point 212 to the second auxiliary component 5B. The second wire 3B strained between the second point 212 and the second auxiliary component 5B is out of contact with the inner surface 21a of the panel body 21.

When a load F is applied to the panel body 21 of the stiffened panel structure 1 of the present embodiment, as in the case of the first embodiment, the wires 3A and 3B are subjected to tensile force T, and the panel body 21 receives reaction force to the tensile force T from the wires 3 on the first point 211 and the second point 212. This suppresses deformation of the panel body 21 at the first point 211 and the second point 212. The suppression of deformation of the panel body 21 at the first point 211 and the second point 212 makes it possible to suppress deformation of the first area A1 and the second area A2 of the panel body 21. Thus, deformation of the outward deformation areas can be suppressed. Then, when a load F is applied to the panel body 21, deformation of the expected load point can be suppressed.

As described above, the stiffened panel structure 1 of the present embodiment has the same advantages as the first embodiment.

In the present embodiment, the first wire 3A is provided to suppress deformation of the panel body 21 at the first point 211, and the second wire 3B is provided to suppress deformation of the panel body 21 at the second point 212. However, providing either the first wire 3A or the second wire 3B is satisfactory. In other words, providing only one of the first and second wires 3A and 3B brings sufficient results. Only by suppressing deformation of the panel body 21 either at the first point 211 or the second point 212, deformation of the expected load point due to a load F applied thereto can be suppressed more or less.

Fourteenth Embodiment

Figure 23:
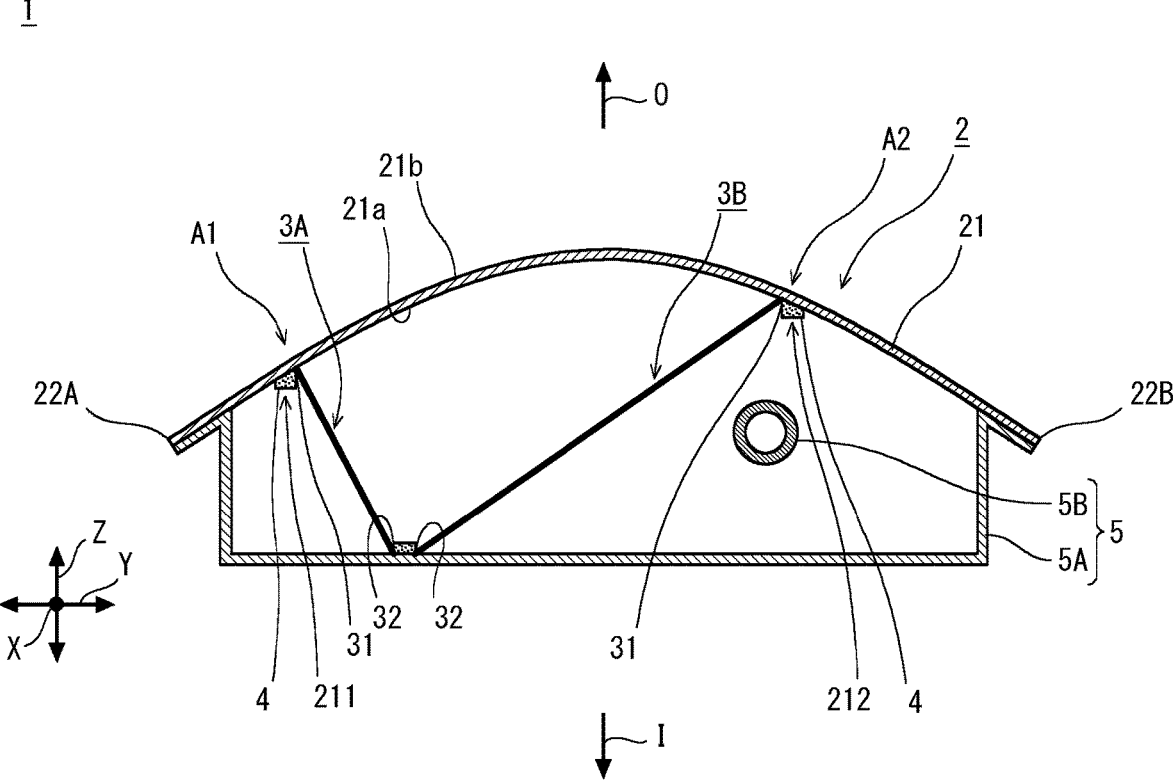
FIG. 23 is a sectional view of a stiffened panel structure according to a fourteenth embodiment.

FIG. 23 shows a stiffened panel structure 1, in which a panel-shaped component 2 is stiffened, according to a fourteenth embodiment. FIG. 23 is a sectional view of the stiffened panel structure 1 when the panel-shaped component 2 is cut in a plane perpendicular to X direction. The stiffened panel structure 1 of the fourteenth embodiment is a modification of the stiffened panel structure 1 of the thirteenth embodiment. The fourteenth embodiment will hereinafter be described mainly with respect to differences from the thirteenth embodiment.

In the stiffened panel structure 1 of the present embodiment, the first end portion 31 of the first wire 3A is bonded to a first point 211 of the panel body 21 (panel body of the door outer panel). The second end portion 32 of the first wire 3A is bonded to the first auxiliary component 5A (door inner panel). Then, the first wire 3A is strained between the first point 211 and the first auxiliary component 5A.

The second end portion 32 of the second wire 3B is bonded to a second point 212 of the panel body 21 (panel body of the door outer panel). The second end portion 32 of the second wire 3B is bonded to the first auxiliary component 5A (door inner panel). Then, the second wire 3B is strained between the second point 212 and the first auxiliary component 5A.

The way of bonding each of the wires 3A and 3B to the first auxiliary component 5A is adhesive bonding. This is because adhesive bonding is simple and easy. However, welding or mechanical fastening may be used as the way of bonding.

In this case, the first wire 3A extends linearly from the first point 211 and the first auxiliary component 5A. The first wire 3A strained between the first point 211 and the first auxiliary component 5A is out of contact with the inner surface 21a of the panel body 21. Additionally, the second wire 3B extends linearly from the second point 212 to the first auxiliary component 5A. The second wire 3B strained between the second point 212 and the first auxiliary component 5A is out of contact with the inner surface 21a of the panel body 21.

The stiffened panel structure 1 of the present embodiment has the same advantages as the thirteenth embodiment.

Fifteenth Embodiment

Figure 24:
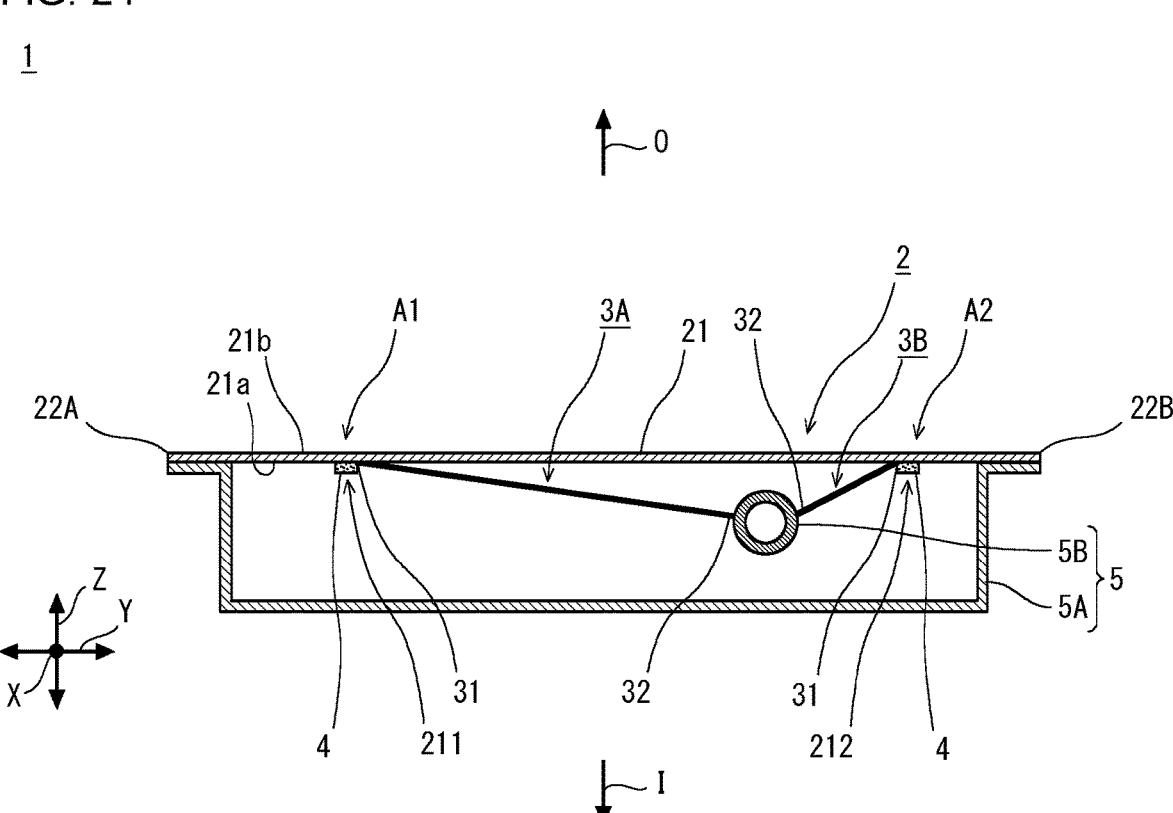
FIG. 24 is a sectional view of a stiffened panel structure according to a fifteenth embodiment.

FIG. 24 shows a stiffened panel structure 1, in which a panel-shaped component 2 is stiffened, according to a fifteenth embodiment. FIG. 24 is a sectional view of the stiffened panel structure 1 when the panel-shaped component 2 is cut in a plane perpendicular to X direction. The stiffened panel structure 1 of the fifteenth embodiment is a modification of the stiffened panel structure 1 of the thirteenth embodiment. The fifteenth embodiment will hereinafter be described mainly with respect to differences from the thirteenth embodiment.

In the present embodiment, the panel-shaped component 2 of the stiffened panel structure 1 is entirely flat. Accordingly, the panel body 21 is flat. The first end portion 31 of the first wire 3A is bonded to a first point 211 of the panel body 21. The first end portion 31 of the second wire 3B is bonded to a second point 212 of the panel body 21. The respective second end portions 32 of the first wire 3A and the second wire 3B are bonded to the second auxiliary component 5B.

The stiffened panel structure 1 of the present embodiment has the same advantages as the thirteenth embodiment.

Sixteenth Embodiment

Figure 25:
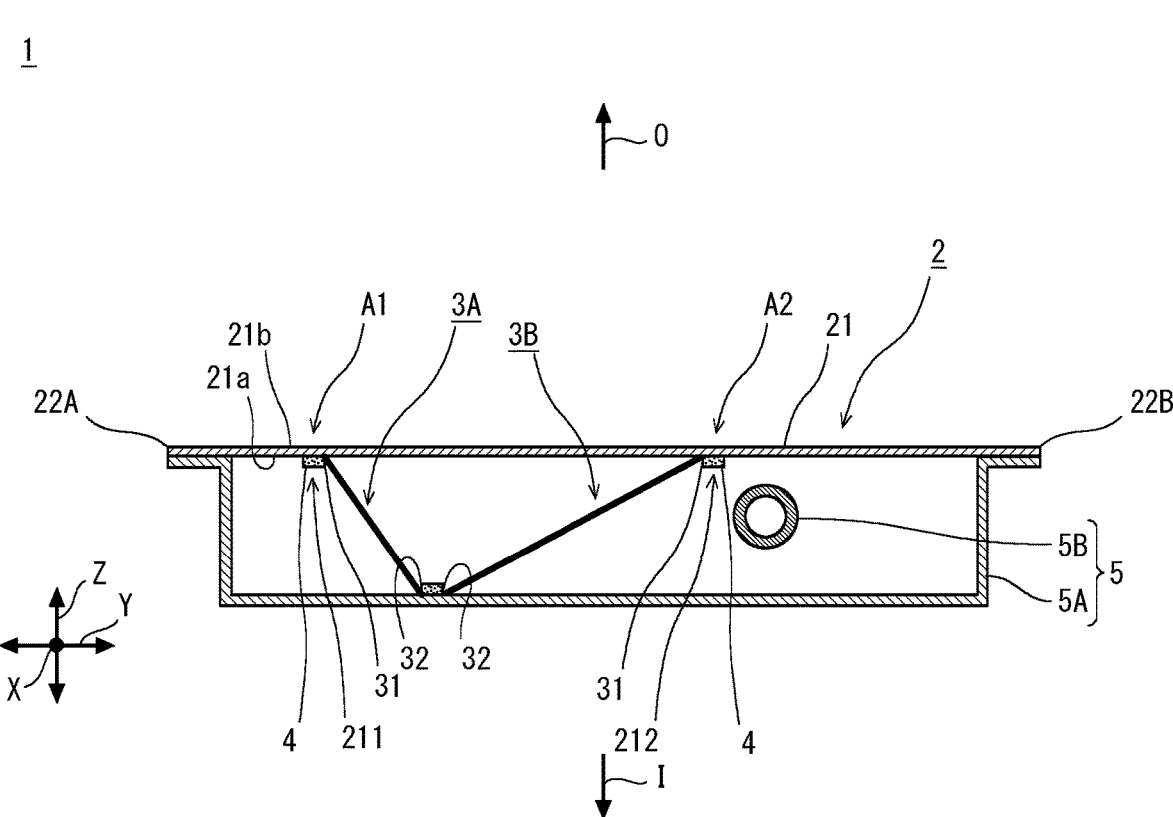
FIG. 25 is a sectional view of a stiffened panel structure according to a sixteenth embodiment.

FIG. 25 shows a stiffened panel structure 1, in which a panel-shaped component 2 is stiffened, according to a sixteenth embodiment. FIG. 25 is a sectional view of the stiffened panel structure 1 when the panel-shaped component 2 is cut in a plane perpendicular to X direction. The stiffened panel structure 1 of the sixteenth embodiment is a modification of the stiffened panel structure 1 of the fourteenth embodiment. The sixteenth embodiment will hereinafter be described mainly with respect to differences from the fourteenth embodiment.

In the present embodiment, the panel-shaped component 2 of the stiffened panel structure 1 is entirely flat. Accordingly, the panel body 21 is flat. The first end portion 31 of the first wire 3A is bonded to a first point 211 of the panel body 21. The first end portion 31 of the second wire 3B is bonded to a second point 212 of the panel body 21. The respective second end portions 32 of the first wire 3A and the second wire 3B are bonded to the bottom of the first auxiliary component 5A.

The stiffened panel structure 1 of the present embodiment has the same advantages as the fourteenth embodiment.

Seventeenth Embodiment

Figure 26:
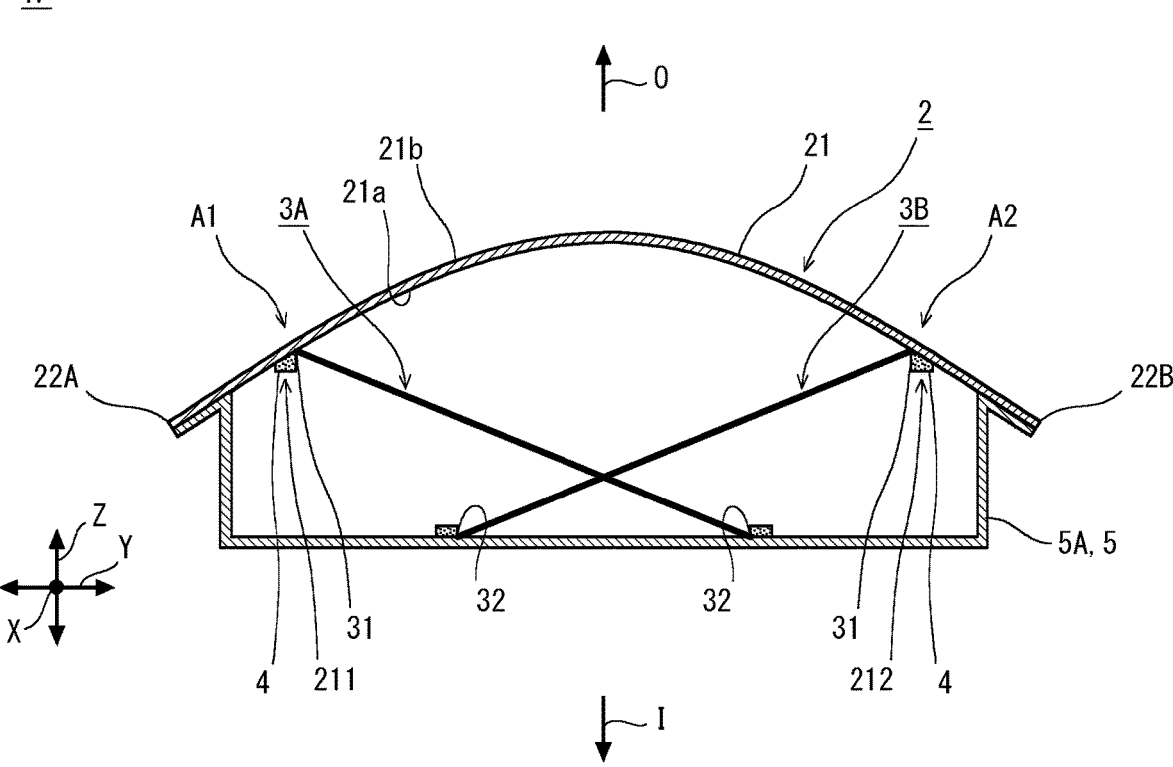
FIG. 26 is a sectional view of a stiffened panel structure according to a seventeenth embodiment.

FIG. 26 shows a stiffened panel structure 1F, in which a panel-shaped component 2 is stiffened, according to a seventeenth embodiment. FIG. 26 is a sectional view of the stiffened panel structure 1 when the panel-shaped component 2 is cut in a plane perpendicular to X direction. The stiffened panel structure 1F of the seventeenth embodiment is a modification of the stiffened panel structure 1 of the fourteenth embodiment. The seventeenth embodiment will hereinafter be described mainly with respect to differences from the fourteenth embodiment.

The stiffened panel structure 1F of the seventeenth embodiment includes a first auxiliary component 5A (a door inner panel) as an auxiliary component 5 but does not include a second auxiliary component 5B (a door impact beam).

The stiffened panel structure 1F of the seventeenth embodiment includes five first wires 3A and five second wires 5B. Thus, the total number of wires 3 is ten. The first wires 3A and the second wires 3B are equal in length. In planar view from X direction, the first wires 3A intersect the second wires 3B. The five first wires 3A are arranged side by side in X direction in an equidistant manner. The five second wires 3B are arranged side by side in X direction in an equidistant manner.

The respective first end portions 31 of the first wires 3A are bonded to first points 211 of the panel body 21. The respective first end portions 31 of the second wires 3B are bonded to second points 212 of the panel body 21. The respective second end portions 32 of the first wires 3A and the second wires 3B are bonded to the bottom of the first auxiliary component 5A.

The stiffened panel structure 1F of the present embodiment has the same advantages as the fourteenth embodiment.

(Fourth Load Test)

Figure 27:
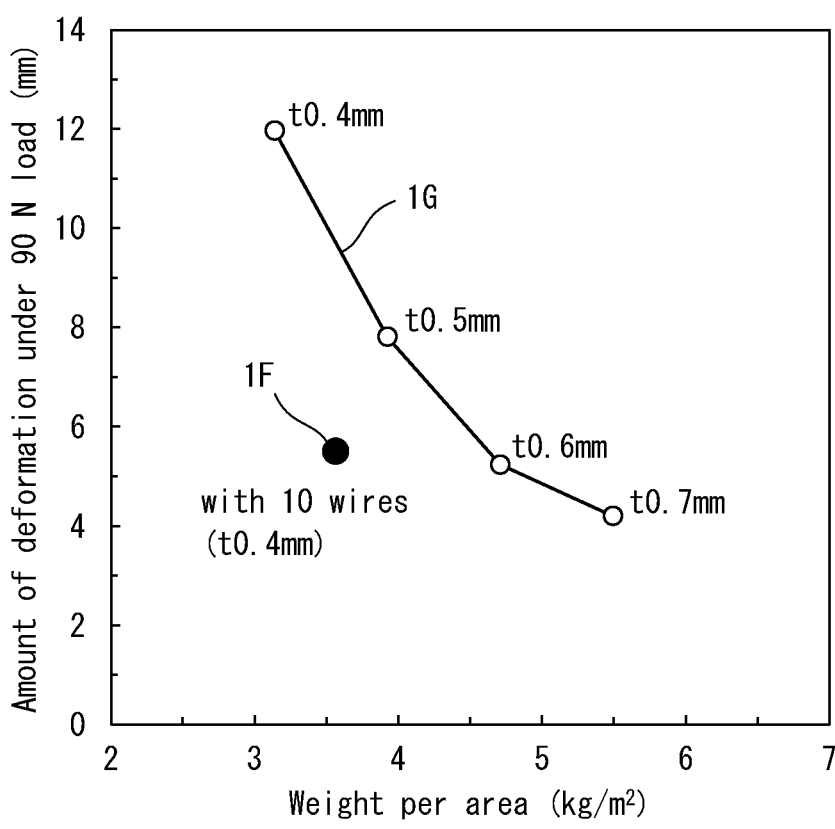
FIG. 27 is a chart showing results of a fourth load test on the stiffened structure according to the seventeenth embodiment.
Figure 28:
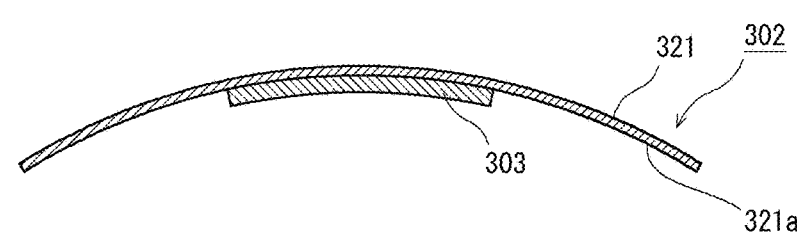
FIG. 28 is a sectional view of an example of a conventional stiffened structure.
Figure 28:
Figure 28:
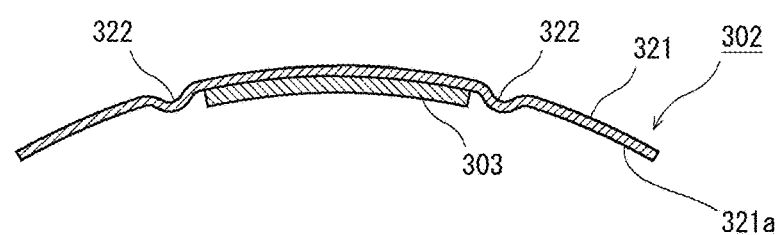
Figure 29:
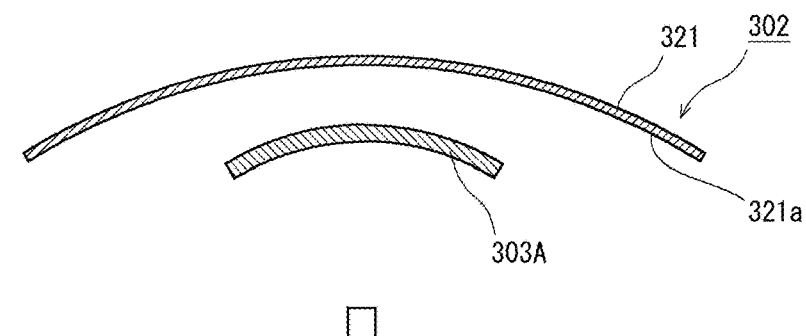
FIG. 29 is a sectional view of another example of a conventional stiffened structure.
Figure 29:
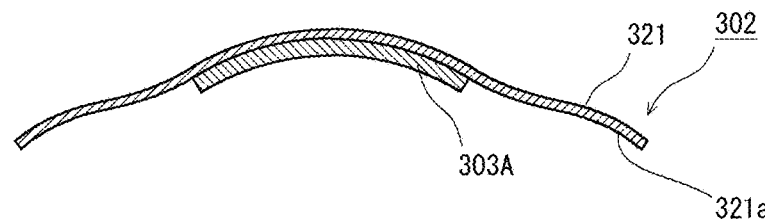

FIG. 27 is a chart showing results of a fourth load test that on the stiffened panel structure of the seventeenth embodiment. FIG. 27 shows the relationship between the weight per unit area of the panel-shaped component and the amount of deformation of the panel-shaped component. As in the first load test, the amount of deformation means the amount of displacement of the point of the panel body onto which the load was applied (the amount of displacement of the expected load point).

For the fourth load test, the stiffened panel structure 1F, in which the panel-shaped component 2 is stiffened, according to the seventeenth embodiment was prepared. Additionally, for comparison, non-stiffened panel structures 1G, that is, panel-shaped components 2 with no wires attached thereto were prepared. Each of the panel-shaped components 2 was bonded to the first auxiliary component 5A. A load of 90 N was applied to each of the panel-shaped components 2, and the amount of deformation was measured.

The principal conditions of the test that was conducted on the stiffened panel structure 1F and the non-stiffened panel structures 1G were as follows.

The material of the panel-shaped components 2 was a cold-rolled steel sheet for automotive use JSC270D according to Japan Iron and Steel Federation Standards (JFS). Each of the panel-shaped components 2 was rectangular in planar view from Z direction, and the sides defining the outline of the panel-shaped component 2 was each 400 mm in length. The height from the bottom of the first auxiliary component 5A to the junctions between the respective first end portions 31 of the first wires 3A and the second points 212 of the panel body 21 was 100 mm. The material of the first auxiliary component 5A was the same as the material of the panel-shaped components 2.

The material of the wires 3 was rolled steel for general structure SS400 (JIS G 3101). Each of the wires 3 was a single wire with a diameter of 2.0 mm. The wires 3 were 275 mm in length.

A low-odorousness acrylic adhesive Y-600 made by Cemedine Co., Ltd. was used as the adhesive 4 for bonding between the wires 3 and the panel-shaped components 2.

The sheet thickness t of the panel-shaped component 2 of the stiffened panel structure 1F was 0.4 mm. As the non-stiffened panel structures 1G, four panel-shaped components 2 that were different in sheet thickness t were subjected to the test. The sheet thicknesses t of these four panel-shaped components 2 were 0.4 mm, 0.5 mm, 0.6 mm and 0.7 mm, respectively. The sheet thickness of the first auxiliary component 5A was 0.75 mm.

As shown in FIG. 27, when the panel-shaped components 2 with the same sheet thickness t of 4.0 mm are compared with each other, the amount of deformation of the panel-shaped component 2 of the stiffened panel structure 1F was much smaller than the amount of deformation of the panel-shaped component 2 of the non-stiffened panel structure 1G. The weight per unit area of the panel-shaped component 2 of the stiffened panel structure 1F was much smaller than the weight per unit area of any of the panel-shaped components 2 of the non-stiffened panel structures 1G with a sheet thickness of 0.5 mm or more.

Some embodiments of the present disclosure have been described. However, these embodiments are merely examples to show how to carry out the present disclosure. Therefore, the present disclosure is not limited to the above-described embodiments, and the present disclosure can be carried out by modifying the above-described embodiments appropriately without departing from the scope thereof.

For example, the wires 3 may be CFRP wires. The CFRP wires may be thermosetting CFRP wires or thermoplastic CFRP wires. However, those CFRP wires do not have high heat resistance. When CFRP wires are used as the wires 3, there may be a difference in thermal expansion between the wires 3 and the panel body 21. Accordingly, when the wires 3 are CFRP wires, it is preferred that bonding between panel body 21 and the wires 3 is carried out after heat treatment.

LIST OF REFERENCE SIGNS

1, 1A, 1B, 1D, 1F: stiffened panel structure
2: panel-shaped component
21: panel body
21*a*: inner surface of panel body
211: first point
212: second point
A: outward deformation area
A1: first area
A2: second area
25: supporting member
3, 3A, 3B, 3C: wire
31: first end portion
32: second end portion
P1: first expected load point
P2: second expected load point
P3: third expected load point
P4: fourth expected load point
4: adhesive
5: auxiliary component
5A: first auxiliary component
5B: second auxiliary component

The invention claimed is:

1. A stiffened panel structure comprising:
a panel-shaped component including a panel body that curves in such a manner as to be convex outward; and
a wire having a first end portion and a second end portion, the first end portion being bonded to a first point on an inner surface of an area of the panel body excluding lateral edges of the panel-shaped component by an adhesive and the second end portion being bonded to a second point on the inner surface of the area of the panel body excluding the lateral edges by the adhesive in such a manner that the wire is strained between the first point and the second point,
wherein:
the panel body includes:
an expected load point onto which a load is expected to be applied from outside; and
a first area and a second area that, without the wire, are expected to be displaced in directions opposite to a loading direction and away from the expected load point when a load is applied to the expected load point from outside;
the second area is opposed to the first area with the expected load point in between; and
the first point is in the first area, and the second point is in the second area.

2. The stiffened panel structure according to claim 1, wherein the panel-shaped component is made of metal.

3. The stiffened panel structure according to claim 2, wherein the panel-shaped component is made of steel.

4. The stiffened panel structure according to claim 1, wherein the wire is made of metal.

5. The stiffened panel structure according to claim 4, wherein the wire is made of steel.

6. The stiffened panel structure according to claim 2, wherein the panel-shaped component and the wire are made of a same kind of material.

7. The stiffened panel structure according to claim 1, wherein the wire is a CFRP wire.

8. The stiffened panel structure according to claim 1, wherein the panel-shaped component is an outer panel for an automobile.

9. A stiffened panel structure comprising:
a panel-shaped component including a panel body that is flat or curves in such a manner as to be convex outward;
an auxiliary component that is positioned inside the panel-shaped component and integrated with the panel-shaped component; and
a wire having a first end portion and a second end portion, the first end portion being bonded to a first point on an inner surface of an area of the panel body excluding lateral edges of the panel-shaped component by an adhesive and the second end portion being bonded to the auxiliary component by the adhesive in such a manner that the wire is strained between the first point and the auxiliary component,
wherein:
the panel body includes:
an expected load point onto which a load is expected to be applied from outside; and
a first area that, without the wire, is expected to be displaced in a direction opposite to a loading direction and away from the expected load point when a load is applied to the expected load point from outside and
the first point is in the first area.

10. The stiffened panel structure according to claim 9, wherein the panel-shaped component is made of metal.

11. The stiffened panel structure according to claim 9, wherein the wire is made of metal.

12. The stiffened panel structure according to claim 9, wherein the panel-shaped component is an outer panel for an automobile.

13. A stiffened panel structure comprising:
a panel-shaped component including a panel body that is flat or curves in such a manner as to be convex outward;
a supporting member projecting from an inner surface of the panel body; and
a wire having a first end portion and a second end portion, the first end portion being bonded to a first point on the inner surface of an area of the panel body excluding lateral edges of the panel-shaped component by an adhesive and the second end portion being bonded to a second point on the inner surface of the area of the panel body excluding the lateral edges by the adhesive, the second point being opposed to the first point with the supporting member in between, in such a manner that the wire is strained between the first point and the second point via the supporting member,
wherein:
the panel body includes:
an expected load point onto which a load is expected to be applied from outside; and a first area and a second area that, without the wire, are
   expected to be displaced in directions opposite to a
   loading direction and away from the expected load
   point when a load is applied to the expected load
   point from outside;

the second area is opposed to the first area with the
   expected load point in between;

the first point is in the first area, and the second point is
   in the second area; and the supporting member is positioned between the first area
   and the second area.

14. The stiffened panel structure according to claim 13,
wherein the panel-shaped component is made of metal.

15. The stiffened panel structure according to claim 13,
wherein the wire is made of metal.

16. The stiffened panel structure according to claim 13,
wherein the panel-shaped component is an outer panel for an
automobile.

\* \* \* \* \*